United States Patent
Anattasakul et al.

(10) Patent No.: US 11,997,955 B2
(45) Date of Patent: Jun. 4, 2024

(54) AGRICULTURAL CLIP

(71) Applicant: KUBOTA CORPORATION, Osaka (JP)

(72) Inventors: Roatchanatam Anattasakul, Sakai (JP); Pius Ng, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 90 days.

(21) Appl. No.: 17/961,678

(22) Filed: Oct. 7, 2022

(65) Prior Publication Data

US 2024/0114854 A1    Apr. 11, 2024

(51) Int. Cl.
*A01G 9/12*    (2006.01)
*A01G 17/08*    (2006.01)

(52) U.S. Cl.
CPC ............ *A01G 17/08* (2013.01); *A01G 9/128* (2013.01)

(58) Field of Classification Search
CPC ....... A01G 9/128; Y10T 24/155; F16L 3/137; B65D 33/1625
See application file for complete search history.

(56) References Cited

U.S. PATENT DOCUMENTS

| | | | |
|---|---|---|---|
| 4,483,098 A | 11/1984 | Anderson | |
| 5,286,110 A * | 2/1994 | Benson | B65D 33/1625 24/30.5 R |
| 6,378,175 B1 | 4/2002 | Vanderpan | |
| 9,266,648 B2 * | 2/2016 | Marchionda | B65D 33/1625 |
| 2022/0274541 A1 * | 9/2022 | Velázquez | F16L 3/13 |

FOREIGN PATENT DOCUMENTS

| | | |
|---|---|---|
| EP | 1 098 561 B1 | 11/2002 |
| FR | 2 247 157 A2 | 5/1975 |
| FR | 2 623 578 A1 | 5/1989 |
| FR | 2 849 989 A1 | 7/2004 |
| FR | 3 042 095 A1 | 4/2017 |
| JP | 2000-188964 A | 7/2000 |
| KR | 97-26523 U | 7/1997 |
| KR | 20-0466349 Y1 | 4/2013 |
| KR | 10-2343554 B1 | 12/2021 |
| NL | 9200352 A | 9/1993 |
| NL | 2006060 C2 | 7/2012 |

(Continued)

OTHER PUBLICATIONS

Machine English translation of FR 2247157 (written description and claims), titled "Attachment for attaching vine shoots, tree branches and plants to trellis wires.", retrieved from Google Translate on Feb. 28, 2024 (Year: 2024).*

(Continued)

*Primary Examiner* — Robert Sandy
(74) *Attorney, Agent, or Firm* — Keating & Bennett, LLP

(57) ABSTRACT

An agricultural clip includes a base portion, a left arm portion attached to the base portion, a right arm portion attached to the base portion, and a curved protrusion. The left arm portion and the right arm portion define a clip receiving space to receive the agricultural item of interest and the support structure, and the curved protrusion includes a first end attached to one of the left arm portion and the right arm portion, and a second end which is a free end that protrudes into the clip receiving space.

14 Claims, 31 Drawing Sheets

(56) References Cited

FOREIGN PATENT DOCUMENTS

NL          1043625 B1    11/2021
WO     2017/122191 A1     7/2017

OTHER PUBLICATIONS

Perrin et al., "End Effector Including Cutting Blade and Pulley Assembly", U.S. Appl. No. 17/961,666, filed Oct. 7, 2022.
Anattasakul et al., "Robotic Arm Mount Assembly Including Rack and Pinion", U.S. Appl. No. 17/961,668, filed Oct. 7, 2022.
Anattasakul et al., "Agricultural Tool", U.S. Appl. No. 17/961,671, filed Oct. 7, 2022.
Anattasakul et al., "Agricultural Tool", U.S. Appl. No. 17/961,676, filed Oct. 7, 2022.
Ng et al., "Agricultural Tool and Process", U.S. Appl. No. 17/961,680, filed Oct. 7, 2022.
Ng et al., "Agricultural Tool and Process", U.S. Appl. No. 17/961,682, filed Oct. 7, 2022.
Official Communication issued in corresponding European Patent Application No. 23200170.1, mailed on Feb. 13, 2024.

\* cited by examiner

US 11,997,955 B2

AGRICULTURAL CLIP

BACKGROUND

1. Field of the Invention

The present invention relates to an agricultural clip. More specifically, the present invention relates to an agricultural clip that can be used with an agricultural tool that is able to tie/twist an agricultural item of interest and a support structure together, and/or fasten or attach the agricultural item of interest to the support structure.

2. Description of the Related Art

Conventionally, tasks including tying or twisting an agricultural item of interest and a support structure together, and fastening the agricultural item of interest to the support structure have been manual labor tasks that are expensive and timing-consuming. For example, in a case in which the agricultural item of interest is a grape vine cane and a support structure is a wire trellis found in a vineyard, the tasks of tying or twisting the grape vine cane to the wire trellis and fastening the grape vine cane to the wire trellis with tape requires a person to walk through the vineyard and manually perform these tasks. Furthermore, a technique of tying or twisting the grape vine cane to the wire trellis, and fastening or attaching the grape vine cane to the wire trellis with tape, may vary from person to person, which can decrease the reliability and consistency of the grape vine cane being secured and fastened to the wire trellis. This unreliability and inconsistency is undesirable because the grape vine cane being secured and fastened to the wire trellis is important with respect to the health and growth of the grape vine and the quality of the grapes produced by the grape vine.

For the foregoing reasons, there is a need for a tool that can inexpensively and reliably tie/twist an agricultural item of interest and a support structure together, and/or fasten or attach the agricultural item of interest to the support structure, and a clip that can be used with the tool.

SUMMARY OF THE INVENTION

Preferred embodiments of the present invention are directed to agricultural clips that each can be used with an agricultural tool that can tie/twist an agricultural item of interest and a support structure together, and/or fasten or attach the agricultural item of interest to the support structure.

An agricultural clip according to a preferred embodiment of the present invention includes a base portion, a left arm portion attached to the base portion, a right arm portion attached to the base portion, and a curved protrusion. The left arm portion and the right arm portion can define a clip receiving space to receive the agricultural item of interest and the support structure, and the curved protrusion can include a first end attached to one of the left arm portion and the right arm portion, and a second end which is a free end that protrudes into the clip receiving space.

In a preferred embodiment of the present invention, the base portion is rectangularly shaped and includes a rear wall surface, a front wall surface, a left wall surface, and a right wall surface.

In a preferred embodiment of the present invention, the left arm portion includes a first left portion and a second left portion connected to the first left portion by a left tapered portion. The right arm portion can include a first right portion and a second right portion connected to the first right portion by a right tapered portion.

In a preferred embodiment of the present invention, the first left portion is curved, includes a flat outer surface, and is connected to the base portion by a left connection portion. The first right portion is curved, includes a flat outer surface, and is connected to the base portion by a right connection portion. The left connection portion can define a first curved recess, and the right connection portion can define a second curved recess.

In a preferred embodiment of the present invention, the first left portion includes a first middle portion located between the left connection portion and the left tapered portion, the first middle portion is thinner than a rear portion of the first left portion which is located closer to the left connection portion than to the left tapered portion, and is thinner than a forward portion of the first left portion which is located closer to the left tapered portion than to the left connection portion. The first right portion includes a second middle portion located between the right connection portion and the right tapered portion, the second middle portion is thinner than a rear portion of the first right portion which is located closer to the right connection portion than to the right tapered portion, and is thinner than a forward portion of the first right portion which is located closer to the right tapered portion than to the right connection portion.

In a preferred embodiment of the present invention, the second left portion includes a first end attached to the left tapered portion and a second end which is a free end. The second left portion can extend diagonally outward from the first end of the second left portion towards the second end of the second left portion. The second right portion includes a first end attached to the right tapered portion and a second end which is a free end. The second right portion can extend diagonally outward from the first end of the second right portion towards the second end of the second right portion.

In a preferred embodiment of the present invention, the second end of the second left portion includes a flat outer surface, and the second end of the second right portion includes a flat outer surface.

In a preferred embodiment of the present invention, the left arm portion includes a left protrusion attached to the first left portion. The left protrusion can include a first base attached to the first left portion and a main body that extends inwardly, towards the clip receiving space, from the first base to a tip of the left protrusion. The right arm portion includes a right protrusion attached to the first right portion. The right protrusion can include a second base attached to the first right portion and a main body that extends inwardly, towards the clip receiving space, from the second base to a tip of the right protrusion. A space located between the tip of the left protrusion and the tip of the right protrusion can define an opening of the clip receiving space.

In a preferred embodiment of the present invention, the left arm portion and the right arm portion define the clip receiving space such that movement of the clip towards the agricultural item of interest and the support structure pushes the agricultural item of interest and the support structure through the space located between the tip of the left protrusion and the tip of the right protrusion and into the clip receiving space.

In a preferred embodiment of the present invention, the left arm portion includes a first left portion and a second left portion connected to the first left portion by a left tapered portion, and the right arm portion includes a first right portion and a second right portion connected to the first right portion by a right tapered portion. The first left portion is curved and is connected to the base portion by a left connection portion, and the first right portion is curved and is connected to the base portion by a right connection portion. The first end of the curved protrusion is attached to the first left portion at a position located closer to the left tapered portion than to the left connection portion, or is attached to the first right portion at a position located closer to the right tapered portion than to the right connection portion.

In a preferred embodiment of the present invention, the left arm portion includes a first left portion and a second left portion connected to the first left portion by a left tapered portion, and the right arm portion includes a first right portion and a second right portion connected to the first right portion by a right tapered portion. The first left portion is curved and is connected to the base portion by a left connection portion, and the first right portion is curved and is connected to the base portion by a right connection portion. The first end of the curved protrusion is attached to the first left portion at a position located closer to the left connection portion than to the left tapered portion, or is attached to the first right portion at a position located closer to the right connection portion than to the right tapered portion.

In a preferred embodiment of the present invention, the second end of the curved protrusion protrudes into the clip receiving space such that the curved protrusion is flexible and able to bend when the agricultural item of interest grows.

In a preferred embodiment of the present invention, the base portion is rectangularly shaped and includes a rear wall surface, a front wall surface, a left wall surface, and a right wall surface. The left arm portion includes a first left portion and a second left portion connected to the first left portion by a left tapered portion. The first left portion is curved, includes a flat outer surface, and is connected to the base portion by a left connection portion. The second left portion includes a first end attached to the left tapered portion and a second end which is a free end. The second end of the second left portion includes a flat outer surface. The left wall surface of the base portion, the flat outer surface of the first left portion, and the flat outer surface of the second end of the second left portion are coplanar. The right arm portion includes a first right portion and a second right portion connected to the first right portion by a right tapered portion. The first right portion is curved, includes a flat outer surface, and is connected to the base portion by a right connection portion. The second right portion includes a first end attached to the right tapered portion and a second end which is a free end. The second end of the second right portion includes a flat outer surface. The right wall surface of the base portion, the flat outer surface of the first right portion, and the flat outer surface of the second end of the second right portion can be coplanar.

An agricultural clip according to a preferred embodiment of the present invention includes a base portion, a left arm portion attached to the base portion, a right arm portion attached to the base portion, and the left arm portion and the right arm portion define a clip receiving space to receive the agricultural item of interest and the support structure.

In a preferred embodiment of the present invention, the left arm portion includes a first left portion and a second left portion connected to the first left portion by a left tapered portion, and the right arm portion includes a first right portion and a second right portion connected to the first right portion by a right tapered portion.

In a preferred embodiment of the present invention, the first left portion is curved, includes a flat outer surface, and is connected to the base portion by a left connection portion. The first right portion is curved, includes a flat outer surface, and is connected to the base portion by a right connection portion. The left connection portion defines a first curved recess, and the right connection portion defines a second curved recess.

In a preferred embodiment of the present invention, the first left portion includes a first middle portion located between the left connection portion and the left tapered portion, the first middle portion is thinner than a rear portion of the first left portion which is located closer to the left connection portion than to the left tapered portion, and is thinner than a forward portion of the first left portion which is located closer to the left tapered portion than to the left connection portion. The first right portion includes a second middle portion located between the right connection portion and the right tapered portion, the second middle portion is thinner than a rear portion of the first right portion which is located closer to the right connection portion than to the right tapered portion, and is thinner than a forward portion of the first right portion which is located closer to the right tapered portion than to the right connection portion.

In a preferred embodiment of the present invention, the second left portion includes a first end attached to the left tapered portion and a second end which is a free end. The second left portion extends diagonally outward from the first end of the second left portion towards the second end of the second left portion. The second right portion includes a first end attached to the right tapered portion and a second end which is a free end. The second right portion extends diagonally outward from the first end of the second right portion towards the second end of the second right portion.

In a preferred embodiment of the present invention, the left arm portion includes a left protrusion attached to the first left portion, and the left protrusion includes a first base attached to the first left portion and a main body that extends inwardly, towards the clip receiving space, from the first base to a tip of the left protrusion. The right arm portion includes a right protrusion attached to the first right portion, and the right protrusion includes a second base attached to the first right portion and a main body that extends inwardly, towards the clip receiving space, from the second base to a tip of the right protrusion. A space located between the tip of the left protrusion and the tip of the right protrusion can define an opening of the clip receiving space.

In a preferred embodiment of the present invention, the base portion is rectangularly shaped and includes a rear wall surface, a front wall surface, a left wall surface, and a right wall surface. The left arm portion includes a first left portion and a second left portion connected to the first left portion by a left tapered portion. The first left portion is curved, includes a flat outer surface, and is connected to the base portion by a left connection portion. The second left portion includes a first end attached to the left tapered portion and a second end which is a free end. The second end of the second left portion includes a flat outer surface. The left wall surface of the base portion, the flat outer surface of the first left portion, and the flat outer surface of the second end of the second left portion can be coplanar. The right arm portion includes a first right portion and a second right portion connected to the first right portion by a right tapered portion. The first right portion is curved, includes a flat outer surface, and is connected to the base portion by a right connection portion. The second right portion includes a first end attached to the right tapered portion and a second end which is a free end. The second end of the second right portion includes a flat outer surface. The right wall surface of the base portion, the flat outer surface of the first right portion, and the flat outer surface of the second end of the second right portion can be coplanar.

The above and other features, elements, steps, configurations, characteristics, and advantages of the present invention will become more apparent from the following detailed description of preferred embodiments of the present invention with reference to the attached drawings.

DETAILED DESCRIPTION OF PREFERRED EMBODIMENTS

Figure 1:
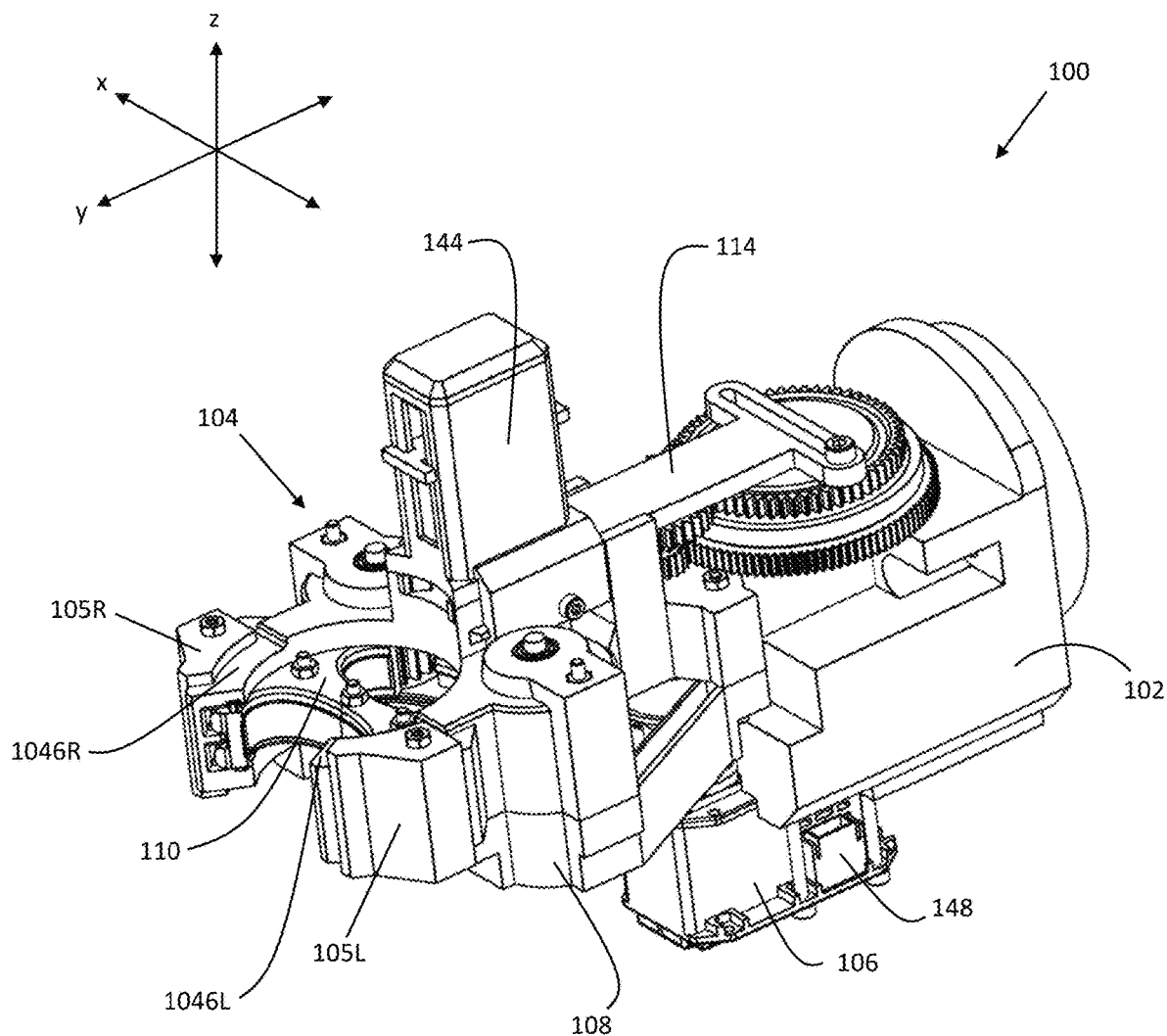
FIG. 1 shows a front perspective view of an agricultural tool according to a preferred embodiment of the present invention.

FIG. 1 shows a front perspective view of an agricultural tool 100 according to a preferred embodiment of the present invention. As shown in FIG. 1, the agricultural tool 100 includes a mounting assembly 102, a frame 104 attached to the mounting assembly 102, a motor 106 attached to the mounting assembly 102, a cover 108 attached to the frame 104, a main gear 110 supported by the frame 104, a magazine 144 attached to the frame 104, and a sliding arm 114 that is supported by the frame 104. FIG. 1 shows a y-axis (a front-rear direction of the agricultural tool 100), an x-axis (a right-left direction of the agricultural tool 100), and a z-axis (an up-down direction of the of the agricultural tool 100).

Figure 2:
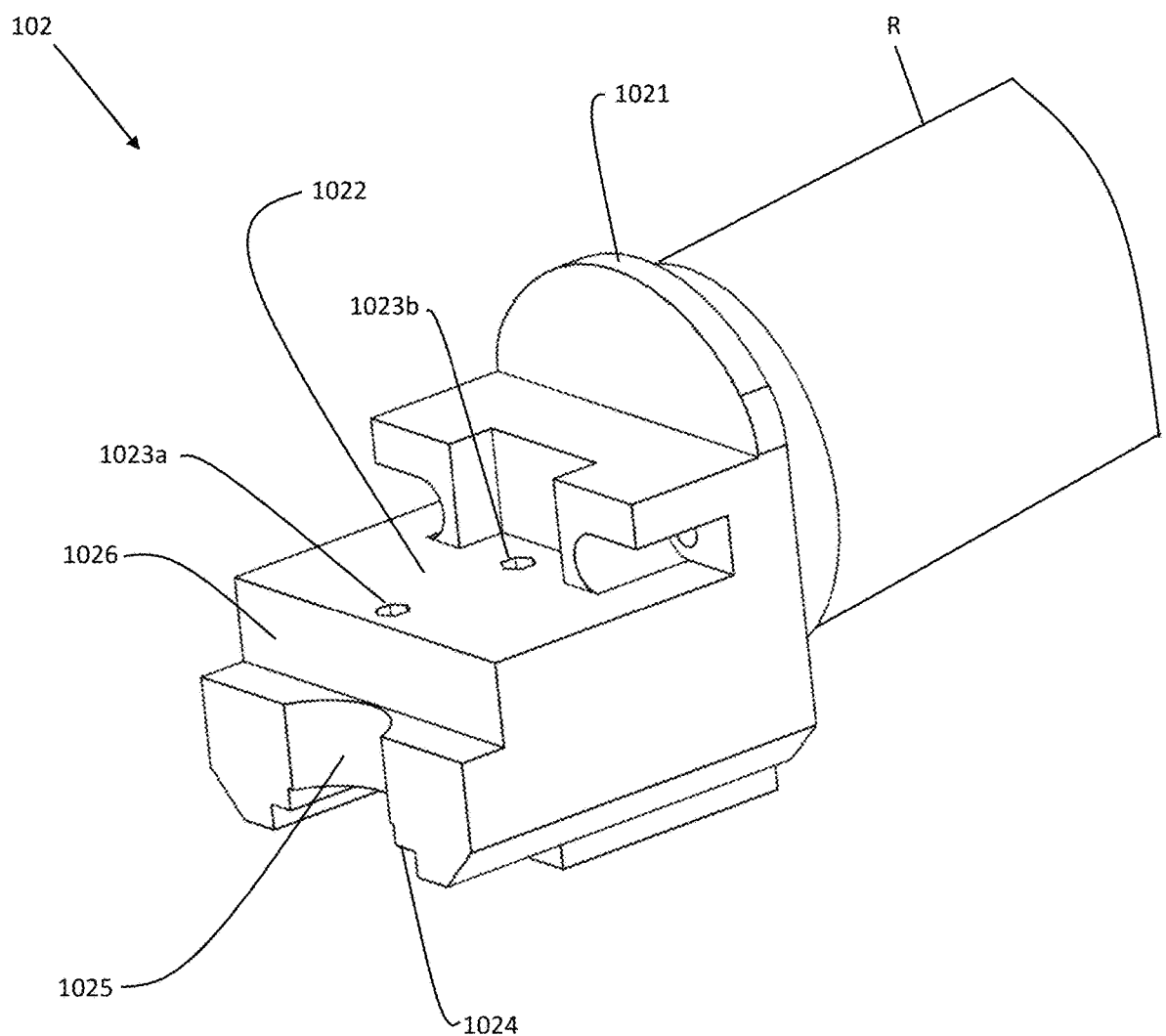
FIG. 2 shows a front perspective view of a mounting assembly included in an agricultural tool according to a preferred embodiment of the present invention.

FIG. 2 is a front perspective view of the mounting assembly 102 according to a preferred embodiment of the present invention. The mounting assembly 102 includes a base plate 1021, which can be mounted to a robotic arm R known to a person of ordinary skill in the art and discussed in more detail below. Alternatively, the base plate 1021 can be mounted to another structure (e.g., a handle that can be held by a person). The base plate 1021 preferably has a circular shape, but the base plate 1021 can be shaped differently and have a rectangular shape, for example. The mounting assembly 102 includes a first recess 1022 to accommodate a portion of the frame 104 (e.g., a base portion 1041 of the frame 104), as discussed in more detail below. The first recess 1022 includes a plurality of mounting holes for mounting the frame 104 to the mounting assembly 102. For example, FIG. 2 shows a front mounting hole 1023a and a rear mounting hole 1023b which can be used to mount the frame 104 to the mounting assembly 102, as discussed in more detail below.

In a preferred embodiment of the present invention, the mounting assembly 102 includes a second recess 1024 to accommodate the motor 106, and the second recess 1024 includes a motor mount recess 1025 to accommodate a motor mount 1062 of the motor 106. Preferably, the motor mount recess 1025 has a rounded shape to accommodate a circular shape of the motor mount 1062 shown in FIG. 10, however, the motor mount recess 1025 can be shaped differently, for example, based on a shape of the motor mount.

In a preferred embodiment of the present invention, the mounting assembly 102 includes a third recess 1026 located between the first recess 1022 and the second recess 1024. Preferably, the third recess 1026 is a stepped recess portion located between the first recess 1022 and the second recess 1024 and accommodates a motor pulley 116 in a front-rear direction, as discussed in more detail below with respect to FIG. 10.

As shown in FIG. 1, the motor 106 is attached to the mounting assembly 102. For example, the motor 106 can be fixed to the mounting assembly 102 using a plurality of bolts or screws or other fasteners, such that a main body of the motor 106 is accommodated within the second recess 1024 of the mounting assembly 102, and the motor mount 1062 is accommodated within the motor mount recess 1025.

Figure 3:
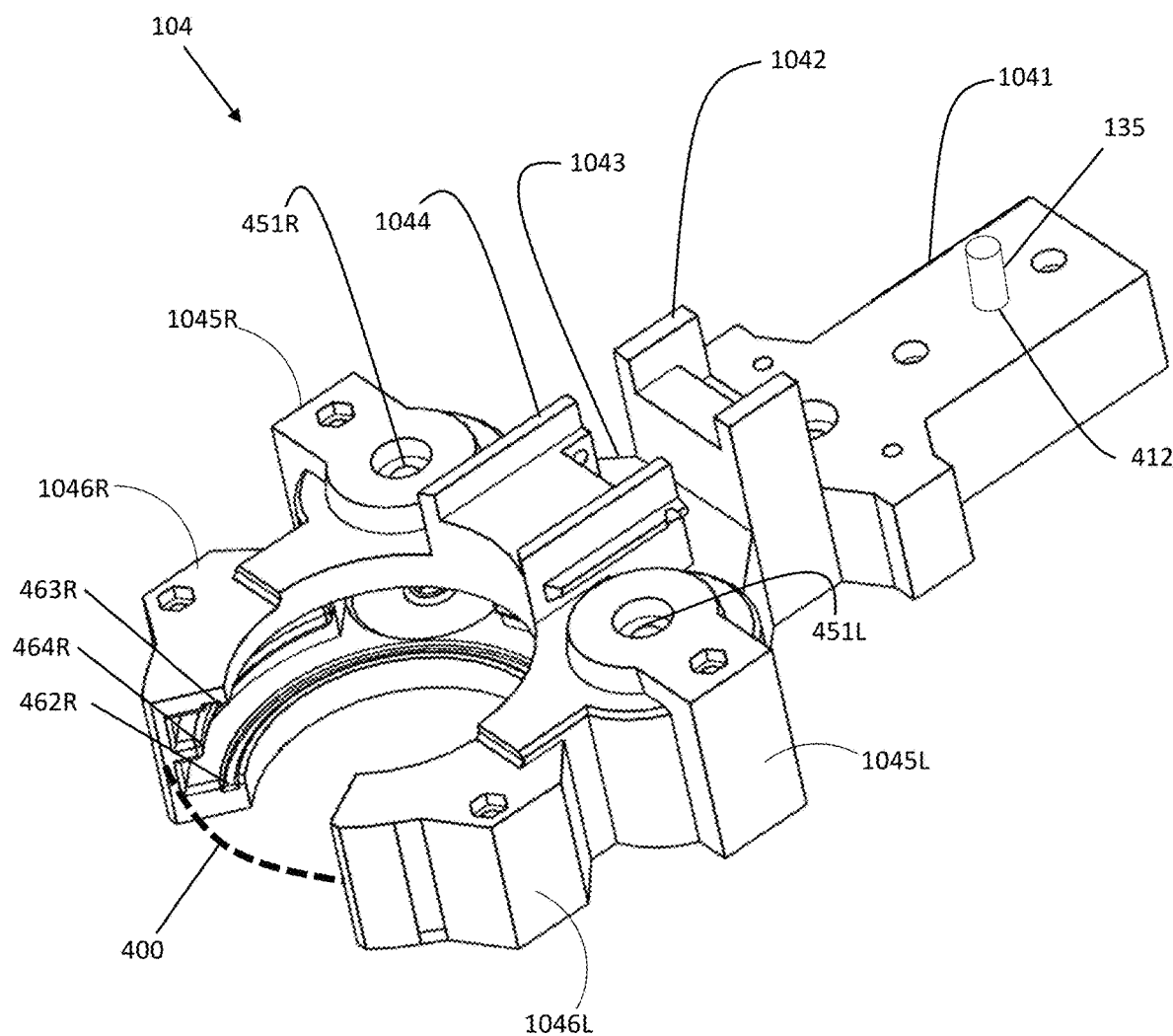
FIG. 3 shows a front perspective view of a frame included in an agricultural tool according to a preferred embodiment of the present invention.
Figure 4:
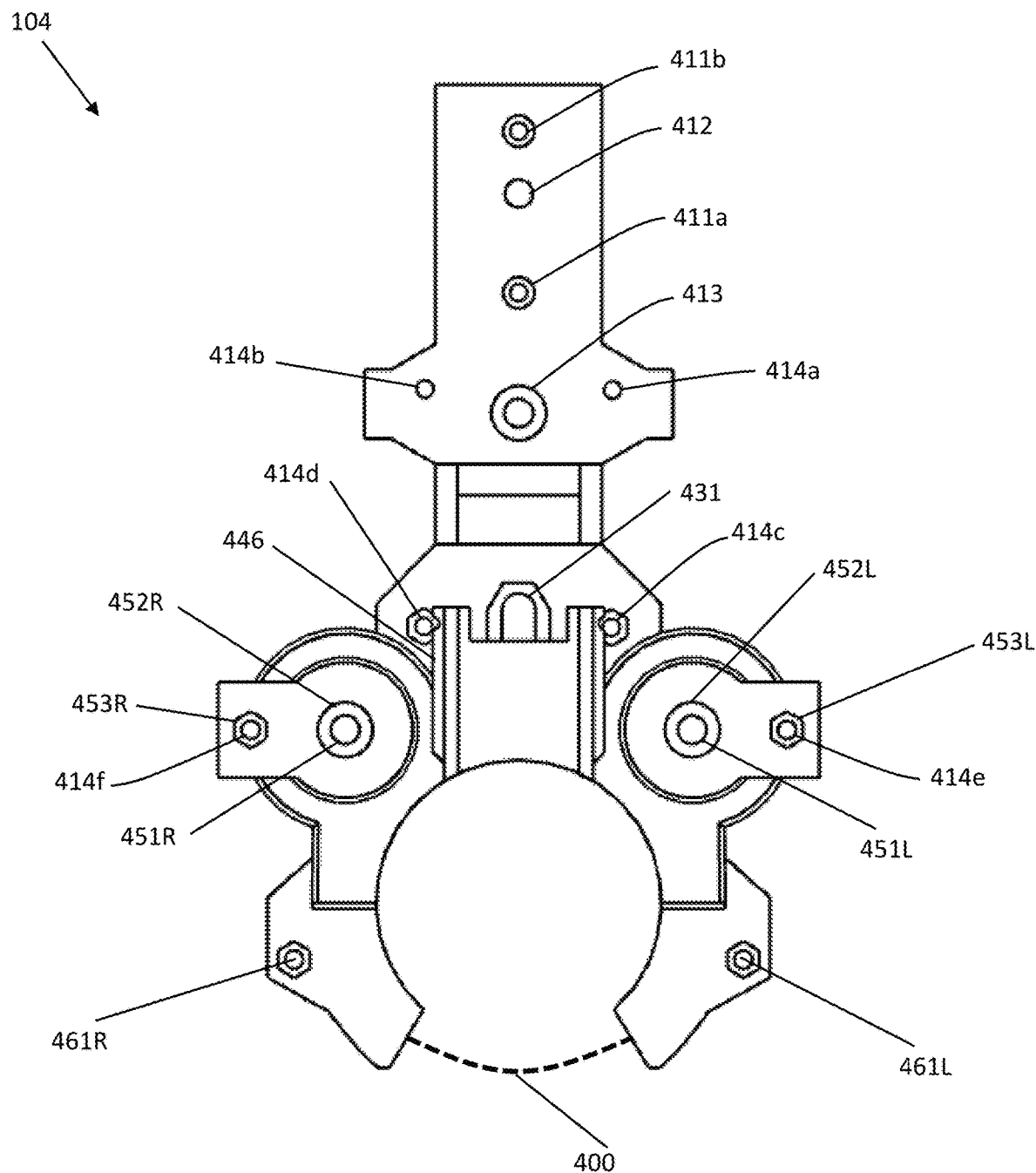
FIG. 4 shows a plan view of a frame included in an agricultural tool according to a preferred embodiment of the present invention.
Figure 5:
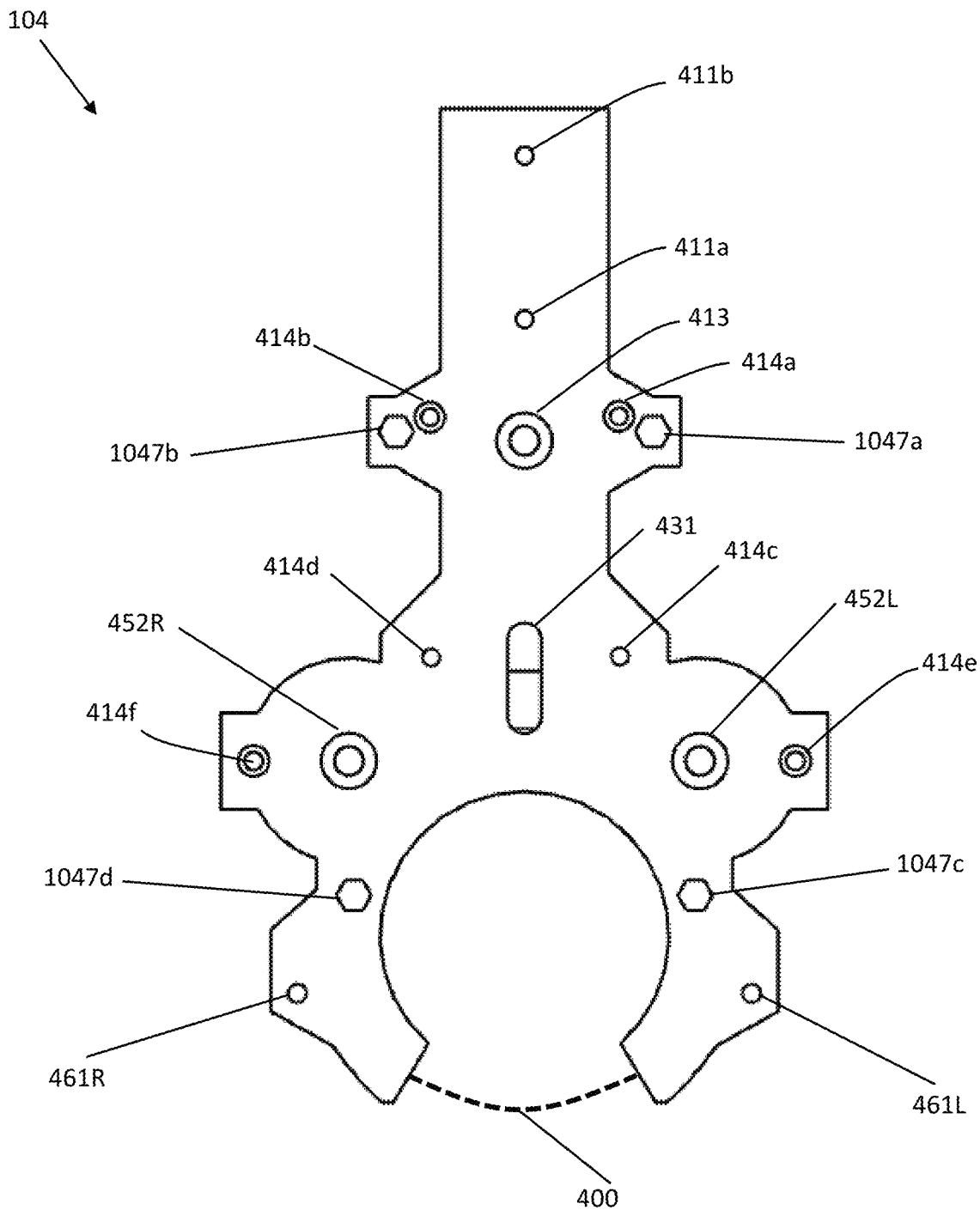
FIG. 5 shows a bottom view of a frame included in an agricultural tool according to a preferred embodiment of the present invention.
Figure 6:
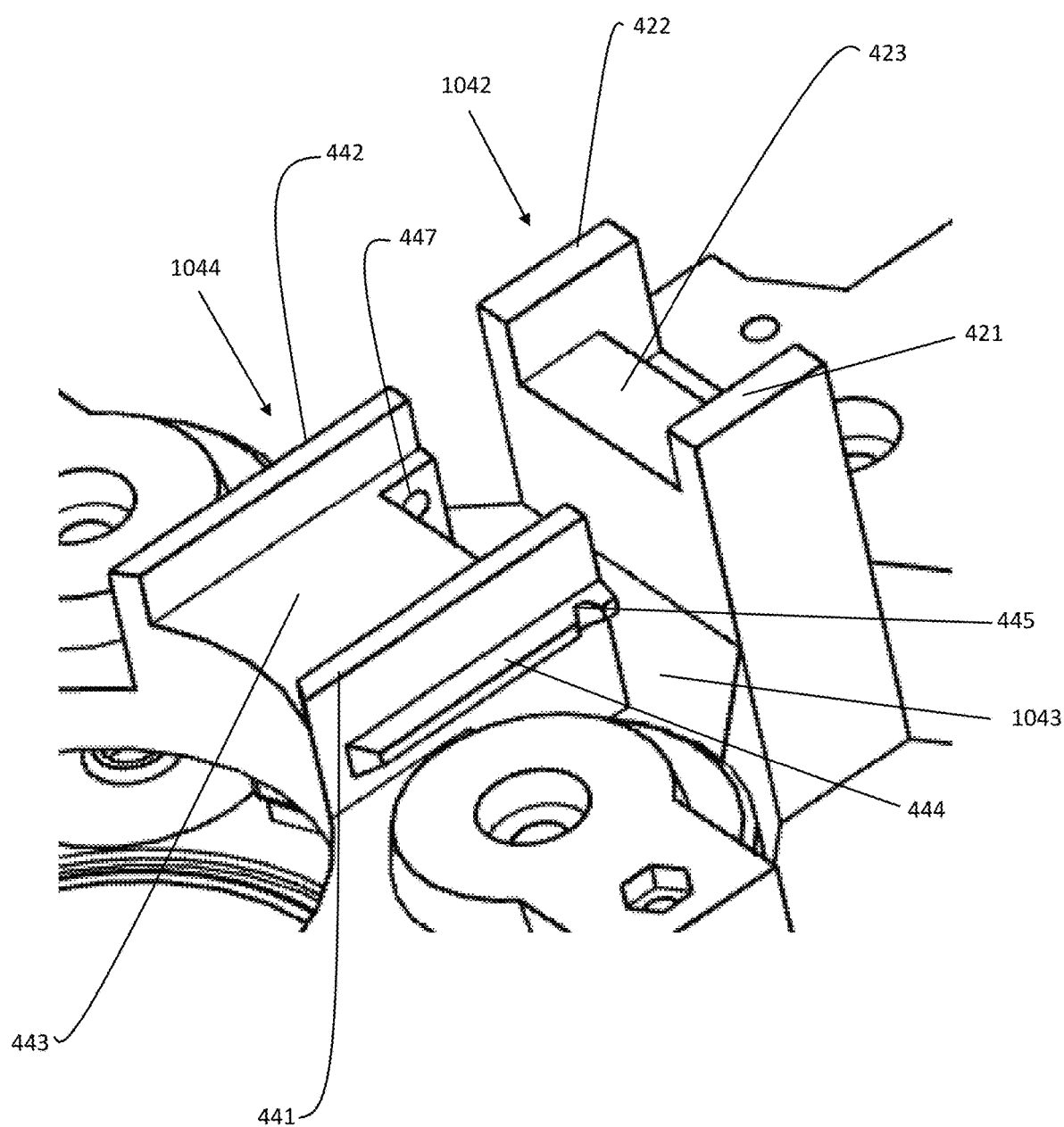
FIG. 6 shows a close-up front perspective view of a portion of a frame included in an agricultural tool according to a preferred embodiment of the present invention.
Figure 7:
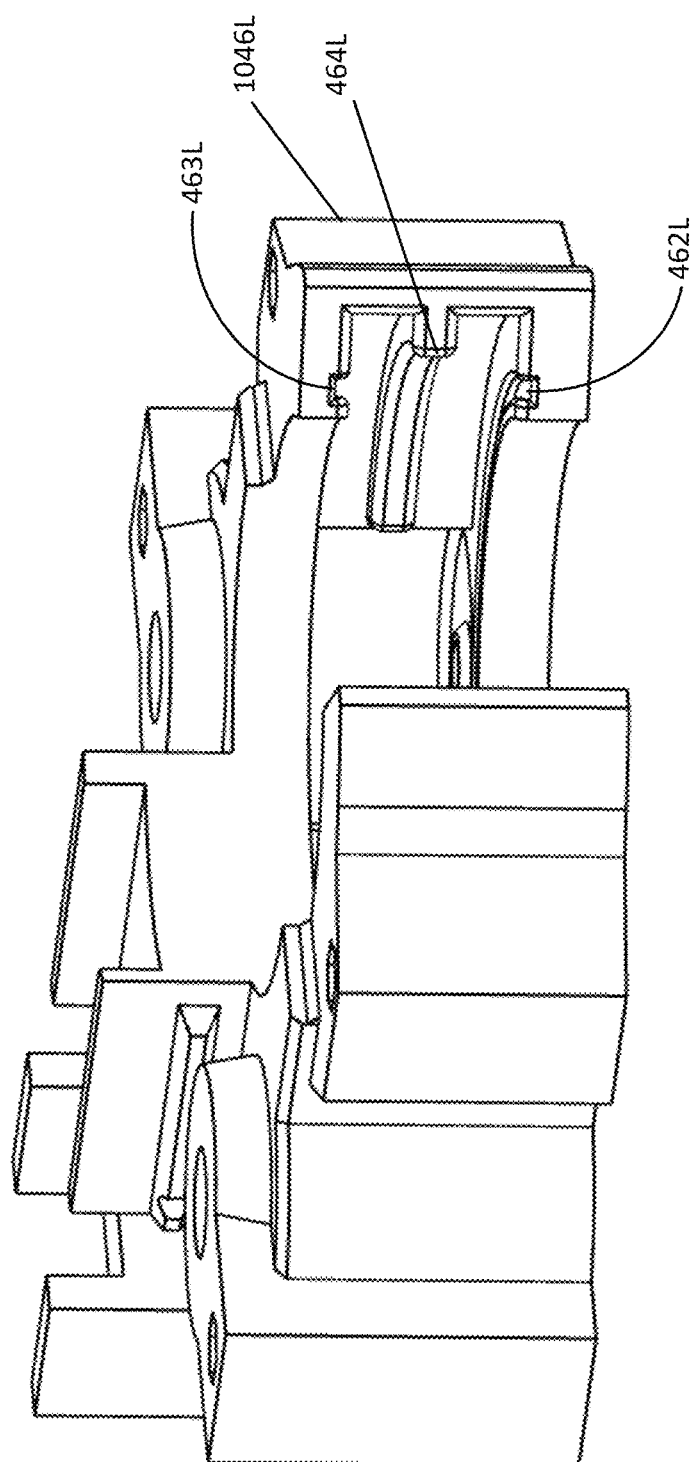
FIG. 7 shows a front perspective view of a portion of a frame included in an agricultural tool according to a preferred embodiment of the present invention.

FIG. 3 is a front perspective view of the frame 104, FIG. 4 is a plan view of the frame 104, FIG. 5 is a bottom view of the frame 104, and FIGS. 6 and 7 are front perspective views of portions of the frame 104. The frame 104 according to a preferred embodiment of the present invention will be described below with respect to FIGS. 3-7.

As shown in FIG. 3, the frame 104 includes a base portion 1041, a first sliding arm support portion 1042 attached to the base portion 1041, a connection portion 1043 connected to the first sliding arm support portion 1042, and a second sliding arm support portion 1044 connected to the connection portion 1043. The frame 104 further includes a left driving gear frame portion 1045L attached to the second sliding arm support portion 1044, a right driving gear frame portion 1045R attached to the second sliding arm support portion 1044, a left main gear frame portion 1046L connected to the left driving gear frame portion 1045L, and a right main gear frame portion 1046R connected to the right driving gear frame portion 1045R. The left main gear frame portion 1046L and the right main gear frame portion 1046R surround, house, and support the main gear 110, as shown in FIG. 1, for example.

In a preferred embodiment of the present invention, the frame 104 can include a plurality of frame layers that, in combination, form the frame 104 described herein. For example, the frame 104 can include an upper portion (e.g., an upper layer), a middle portion (e.g., a middle layer), and a lower portion (e.g., a lower layer) which are fastened together to form the frame 104. The frame 104 can include a plurality of frame shaft holes, e.g., frame shaft holes 414a, 414b, 414c, 414d, 414e, and 414f shown in FIG. 4 through which a frame connection shaft or bolt that connects the plurality of frame layers together extends. Preferably, the plurality of frame shaft holes 414a, 414b, 414c, 414d, 414e, and 414f are spaced apart in a left-right direction of the agricultural tool 100, as shown in FIG. 4. Alternatively to the plurality of frame layers discussed above, the frame 104 can be formed from a single unitary piece.

As shown in FIG. 4, which is a plan view of the frame 104, the base portion 1041 includes a plurality of mounting holes, e.g., a front mounting hole 411a and a rear mounting hole 411b. In a preferred embodiment of the present invention, a first shaft or bolt that attaches the frame 104 (the base portion 1041) to the mounting assembly 102 extends through the front mounting hole 411a of the frame 104 and the front mounting hole 1023a of the mounting assembly 102, and a second shaft or bolt that attaches the frame 104 (the base portion 1041) to the mounting assembly 102 extends through the rear mounting hole 411b of the frame 104 and the rear mounting hole 1023b of the mounting assembly 102.

The base portion 1041 can include a gear shaft hole 412 that holds a gear shaft 135, shown in FIG. 3 and discussed in more detail below. Preferably, the gear shaft hole 412 does not extend completely through the base portion 1041, such that a bottom end of the gear shaft 135 abuts a bottom of the gear shaft hole 412 when the gear shaft 135 is located within the gear shaft hole 412. Preferably, the base portion 1041 includes a motor shaft hole 413 forward of the gear shaft hole 412 in a front-rear direction of the agricultural tool 100, and a motor shaft 1061 of the motor 106 extends through the motor shaft hole 413, as discussed in more detail below.

As shown in FIG. 3, for example, the base portion 1041 is attached to the first sliding arm support portion 1042. As shown in FIG. 6, the first sliding arm support portion 1042 includes a left wall portion 421, a right wall portion 422, and a sliding arm platform portion 423 located between the left wall portion 421 and the right wall portion 422. Preferably, the left wall portion 421 and the right wall portion 422 extend higher than the sliding arm platform portion 423 in the up-down direction of the agricultural tool 100.

In a preferred embodiment of the present invention, the frame 104 includes the connection portion 1043 that is connected to the first sliding arm support portion 1042 and the second sliding arm support portion 1044. Preferably, the second sliding arm support portion 1044 includes a left wall portion 441, a right wall portion 442, and a clip platform portion 443, discussed in more detail below. Preferably, the left wall portion 441 and the right wall portion 442 extend higher than the clip platform portion 443 in the up-down direction of the agricultural tool 100.

In a preferred embodiment of the present invention, the frame 104 includes a left magazine slide track 444 attached to an outer surface of the left wall 441 of the second sliding arm support portion 1044, as shown in FIG. 6, for example. Preferably, the left magazine slide track includes a hole 445 that extends through the left magazine slide track 444 in a left-right direction. The frame 104 includes a right magazine slide track 446 attached to an outer surface of the right wall 442 of the second sliding arm support portion 1044, as shown in FIG. 4, for example. The right magazine slide track 446 includes a hole 447 that extends through the right magazine slide track 446 in the left-right direction.

In a preferred embodiment of the present invention, the frame 104 includes the left driving gear frame portion 1045L attached to the second sliding arm support portion 1044, as shown in FIG. 3, for example. The left driving gear frame portion 1045L houses and surrounds a first driving gear 128 (a left driving gear), as discussed in more detail below. As shown in FIGS. 3 and 4, the left driving gear frame portion 1045L includes a left driving gear shaft hole 451L through which a first driving shaft 124 (a left driving shaft) extends, and a left driving shaft bearing recess 452L that holds a first driving shaft bearing 1241, as discussed in more detail below. The left driving gear frame portion 1045L also includes a frame connection shaft nut recess 453L that holds a nut used with a bolt or shaft that extends through frame shaft hole 414e.

In a preferred embodiment of the present invention, the frame 104 includes the right driving gear frame portion 1045R attached to the second sliding arm support portion 1044, as shown in FIG. 3, for example. The right driving gear frame portion 1045R houses and surrounds a second driving gear 130 (a right driving gear), as discussed in more detail below. As shown in FIGS. 3 and 4, for example, the right driving gear frame portion 1045R includes a right driving gear shaft hole 451R through which a second driving shaft 126 (a right driving shaft) extends, and a driving shaft bearing recess 452R that holds a second driving shaft bearing 1261, as discussed in more detail below. The right driving gear frame portion 1045R also includes a frame connection shaft nut recess 453R that holds a nut used with a bolt or shaft that extends through frame shaft hole 414f.

In a preferred embodiment of the present invention, the frame 104 includes a left main gear frame portion 1046L, as shown in FIG. 3, for example. The left main gear frame portion 1046L includes a first end attached to the left driving gear frame portion 1045L and a second end which is a free end. The left main gear frame portion 1046L includes a frame connection hole 461L, as shown in FIG. 4, through which a bolt or shaft that connects the plurality of frame layers extends.

As shown in FIG. 1, in a preferred embodiment, a left clasp 105L is attached to an outer surface of the left main gear frame portion 1046L and holds the plurality of frame layers of the frame 104. The bolt or shaft that extends through the frame connection hole 461L also extends through the left clasp 105L such that the left clasp is fixed to the left main gear frame portion 1046L.

In a preferred embodiment of the present invention, a portion of the left main gear frame portion 1046L (e.g., an inner surface of the left main gear frame portion 1046L) includes a bottom groove portion 462L, a top groove portion 463L, and a track portion 464L, as shown in FIG. 7. The bottom groove portion 462L, the top groove portion 463L, and the track portion 464L assist with movement of the main gear 110, as discussed in more detail below.

In a preferred embodiment of the present invention, the frame 104 includes a right main gear frame portion 1046R, as shown in FIG. 3, for example. The right main gear frame portion 1046R includes a first end attached to the right driving gear frame portion 1045R and a second end which is a free end. The right main gear frame portion 1046R includes a frame connection hole 461R, as shown in FIG. 4, through which a bolt or shaft that connects the plurality of frame layers extends.

In a preferred embodiment, as shown in FIG. 1, for example, a right clasp 105R is attached to an outer surface of the right main gear frame portion 1046R and holds the plurality of frame layers of the frame 104. The bolt or shaft that extends through the frame connection hole 461R also extends through the right clasp 105R such that the right clasp 105R is fixed to the right main gear frame portion 1046R.

In a preferred embodiment of the present invention, a portion of the right main gear frame portion 1046R (e.g., an inner surface of the right main gear frame portion 1046R) includes one or more of a bottom groove portion 462R, a top groove portion 463R, and a track portion 464R, as shown in FIG. 3. The bottom groove portion 462R, the top groove portion 463R, and the track portion 464R assist with movement of the main gear 110, as discussed in more detail below.

In a preferred embodiment of the present invention, the frame 104 includes a frame opening 400 which is located between the second end of the left main gear frame portion 1046L and the second end of the right main gear frame portion 1046R, as shown in FIGS. 3 and 4, for example. Preferably, the frame 104 also includes an elongated hole 431 that extends through a bottom surface of the frame 104 and extends in a front-rear direction of the agricultural tool 100, as shown in FIGS. 4 and 5, for example. In a preferred embodiment, the elongated hole 431 is included at least partially in the connection portion 1043 of the frame 104.

Figure 8:
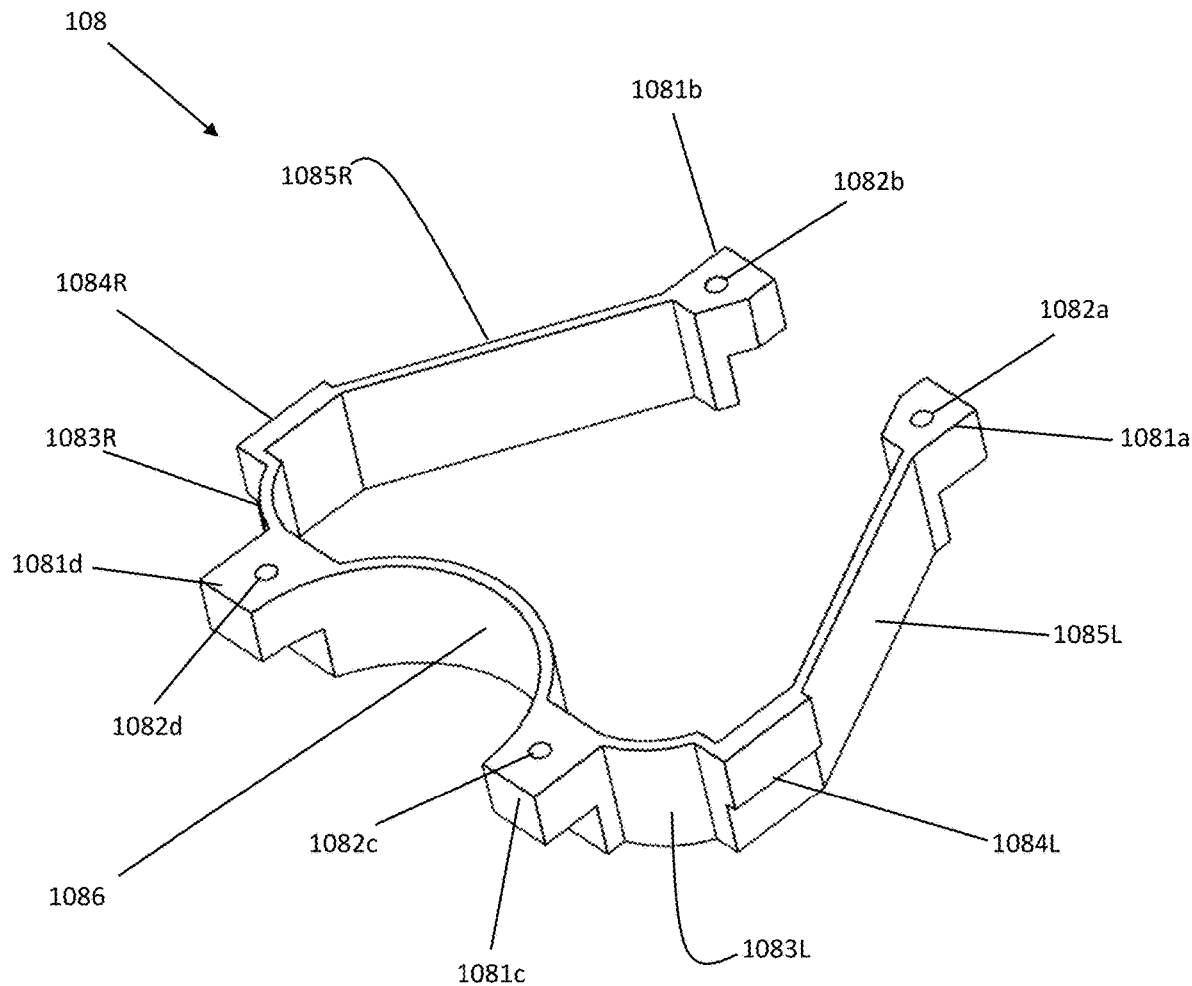
FIG. 8 shows a front perspective view of a cover included in an agricultural tool according to a preferred embodiment of the present invention.

In a preferred embodiment of the present invention, the cover 108 (e.g., shown in FIG. 1) is attached to the frame 104. For example, the cover includes a plurality of tabs that each include a tab hole through which a bolt or shaft that connects the cover 108 to the frame 104 extends. For example, as shown in FIG. 8, the plurality of tabs can include a rear left tab 1081a that includes a tab hole 1082a, a rear right tab 1081b that includes a tab hole 1082b, a front left tab 1081c that includes a tab hole 1082c, and a front right tab 1081d that includes a tab hole 1082d. In a preferred embodiment, a plurality of bolts that connect the cover 108 to the frame 104 extend through the tab hole 1082a, the tab hole 1082b, the tab hole 1082c, and the tab hole 1082d and attach to nuts housed within a plurality of nut recesses 1047a, 1047b, 1047c, and 1047d located on a bottom surface of the frame 104 (see FIG. 5).

In a preferred embodiment of the present invention, the cover 108 houses and surrounds a belt 118, a first driving pulley 120, a second driving pulley 122, a tensioner bearing 1322, and at least a portion of a tensioner shaft 1321, shown in FIG. 10 and as discussed in more detail below. Preferably, the cover 108 includes a first driving pulley portion 1083L (left driving pulley portion) that surrounds the first driving pulley 120 and a second driving pulley portion 1083R (right driving pulley portion) that surrounds the second driving pulley 122. Preferably, the cover 108 includes a first stepped portion 1084L (left stepped portion) and a second stepped portion 1084R (right stepped portion). The cover 108 can include a first diagonal portion 1085L (left diagonal portion) that extends between the left rear tab 1081a and the left stepped portion 1084L, and a second diagonal portion 1085R (right diagonal portion) that extends between the right rear tab 1081b and the right stepped portion 1084R. The first driving pulley portion 1083L extends from the left stepped portion 1084L to the left front tab 1081c, and the second driving pulley portion 1083R extends from the right stepped portion 1084R to the right front tab 1081d. Preferably, the cover 108 includes a curved portion 1086 that extends between the left front tab 1081c and the right front tab 1081d.

Figure 9:
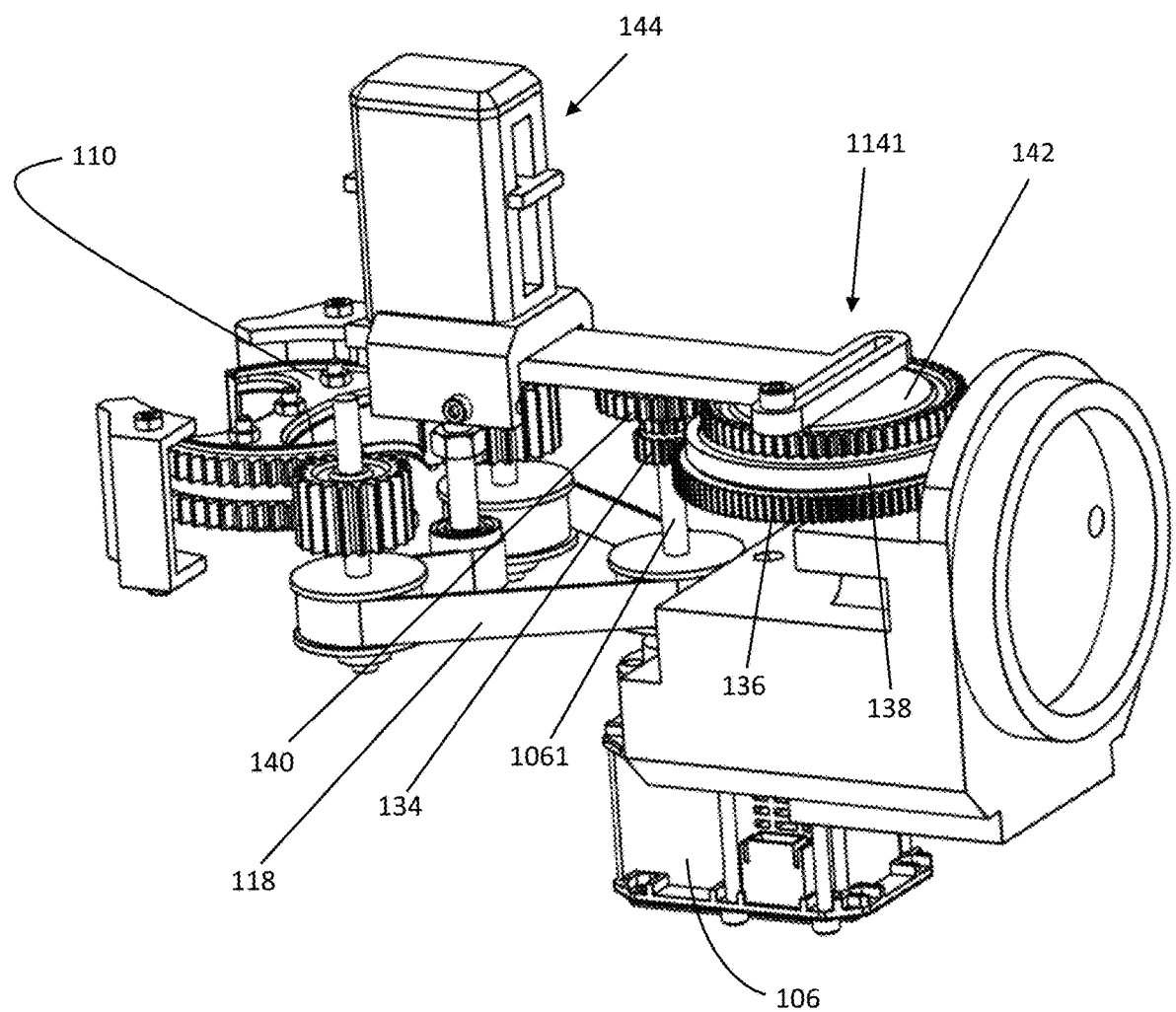
FIG. 9 shows a rear perspective view of an agricultural tool according to a preferred embodiment of the present invention in which a frame and a cover have been removed.

In a preferred embodiment of the present invention, the motor 106 is used to rotate the main gear 110 as discussed in more detail below with reference to FIGS. 9 and 10. FIG. 9 is a rear perspective view of the agricultural tool 100 in which the frame 104 and the cover 108 have been removed to facilitate the illustration of how the motor 106 is used to rotate the main gear 110. FIG. 10 is a rear perspective view that shows components used to rotate the main gear 110 using the motor 106.

Figure 10:
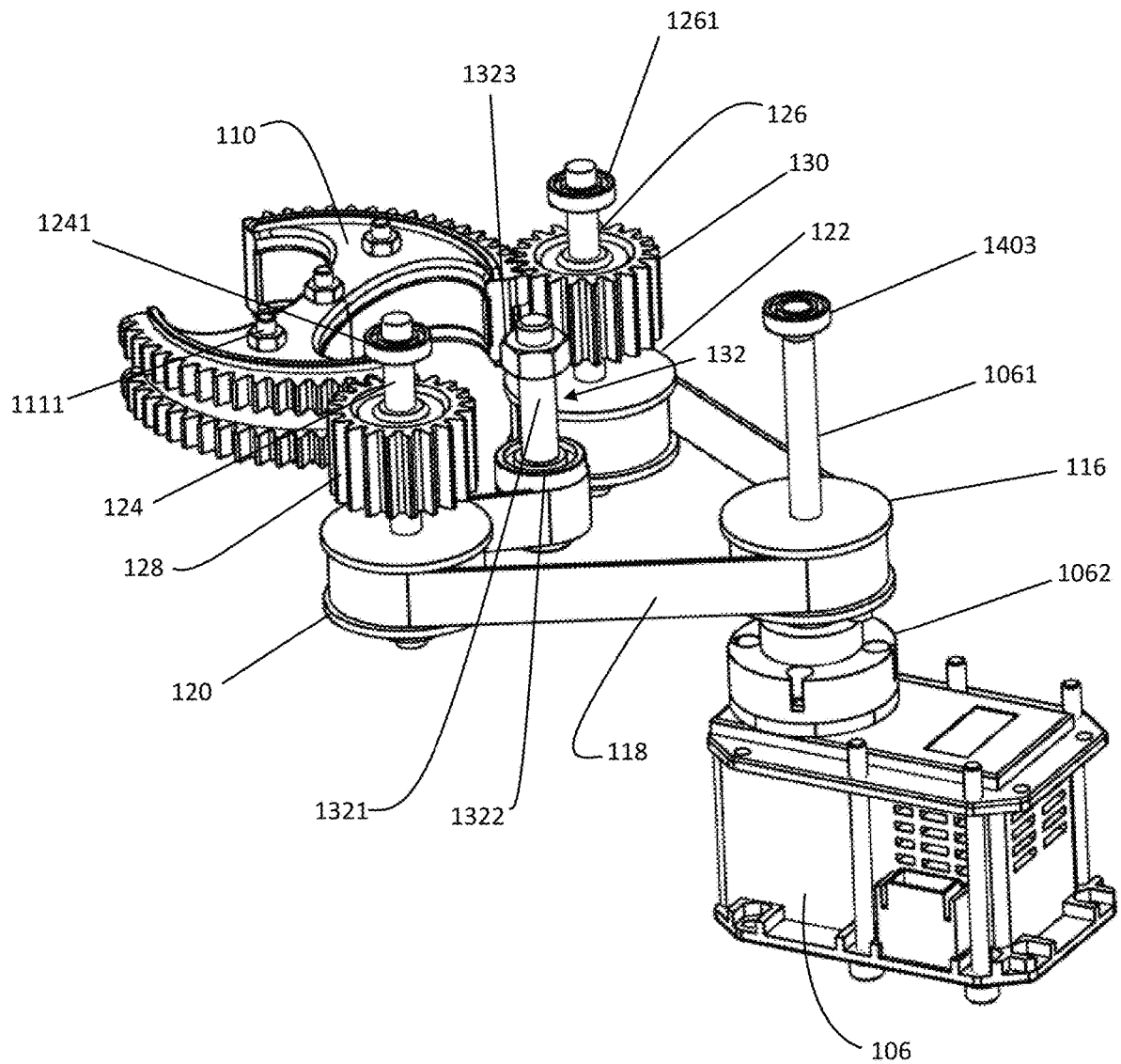
FIG. 10 shows a rear perspective view of components used to rotate a main gear in an agricultural tool according to a preferred embodiment of the present invention.

As shown in FIG. 10, the motor 106 includes a motor shaft 1061 that is driven when the motor 106 is running. The motor 106 includes a motor mount 1062, and the motor shaft 1061 extends through a center hole of the motor mount 1062. As shown in FIG. 10, in a preferred embodiment of the present invention, a motor pulley 116 is attached to the motor shaft 1061 such that the motor pulley 116 rotates when the motor 106 is driven. For example, the motor pulley 116 can be press fit onto the motor shaft 1061 or can be attached the motor shaft 1061 using another fastening technique.

In a preferred embodiment of the present invention, as shown in FIG. 10, a belt 118 is driven by the motor pulley 116. For example, the belt 118 can include teeth which mesh with teeth provided on the motor pulley such that the belt 118 is driven when the motor pulley 116 is driven by the motor 106. In a preferred embodiment, a first driving pulley 120 (e.g., a left driving pulley) and a second driving pulley 122 (e.g., a right driving pulley) are in contact with, and driven by, the belt 118. For example, the belt 118 can include teeth which mesh with teeth provided on the first driving pulley 120 and teeth provided on the second driving pulley 122 such that the first driving pulley 120 and the second driving pulley 122 are driven and rotated when the belt 118 is driven.

In a preferred embodiment of the present invention, the first driving pulley 120 includes a center hole through which a first driving shaft 124 extends. Preferably, the first driving pulley 120 is press fit onto the first driving shaft 124, but the first driving pulley 120 can be attached to the first driving shaft 124 using another fastening technique. Similarly, the second driving pulley 122 includes a center hole through which a second driving shaft 126 extends. Preferably, the second driving pulley 122 is press fit onto the second driving shaft 126, but the second driving pulley 122 can be attached to the second driving shaft 126 using another fastening technique.

In a preferred embodiment of the present invention, as shown in FIG. 10, a first driving gear 128 (a left driving gear) is attached to the first driving shaft 124, and the first driving gear 128 rotates when the first driving shaft 124 rotates. For example, the first driving gear 128 includes a center hole through which the first driving shaft 124 extends, and the first driving gear 128 is press fit onto the first driving shaft 124 such that when the first driving shaft 124 rotates when the first driving pulley 120 is driven by the belt 118, the first driving gear 128 is driven. In a preferred embodiment of the present invention, the first driving gear 128 includes 20 teeth, for example.

In a preferred embodiment of the present invention, as shown in FIG. 10, a second driving gear 130 is attached to the second driving shaft 126, and the second driving gear 130 rotates when the second driving shaft 126 rotates. For example, the second driving gear 130 includes a center hole through which the second driving shaft 126 extends, and the second driving gear 130 is press fit onto the second driving shaft 126 such that when the second driving shaft 126 rotates when the second driving pulley 122 is driven by the belt 118, the second driving gear 130 is driven. In a preferred embodiment of the present invention, the second driving gear 130 includes 20 teeth, for example.

In a preferred embodiment, a first driving shaft bearing 1241 is attached to an upper portion of the first driving shaft 124. Preferably, the first driving shaft bearing 1241 is housed within the driving shaft bearing recess 452L of the frame 104, and the first driving shaft bearing 1241 is press fit into the driving shaft bearing recess 452L. The first driving shaft bearing 1241 rotatably supports the first driving shaft 124 via the frame 104 and facilitates rotation of the first driving shaft 124 with respect to the frame 104.

Similarly, as shown in FIG. 10, a second driving shaft bearing 1261 is attached to an upper portion of the second driving shaft 126. Preferably, the second driving shaft bearing 1261 is housed within the driving shaft bearing recess 452R of the frame 104, and the second driving shaft bearing 1261 is press fit into the driving shaft bearing recess 452R. The second driving shaft bearing 1261 rotatably supports the second driving shaft 126 via the frame 104 and facilitates rotation of the second driving shaft 126 with respect to the frame 104.

In a preferred embodiment of the present invention, as shown in FIG. 10, the agricultural tool 100 includes a tensioner 132, which is attached to the frame 104. Preferably, the tensioner 132 includes a tensioner shaft 1321, a tensioner bearing 1322 attached to a first end of the tensioner shaft 1321, and a tensioner nut 1323 attached to a second end of the tensioner shaft 1321. The tensioner shaft 1321 extends through the tensioner bearing 1322, and the tensioner bearing 1322 is in contact with the belt 118. The tensioner shaft 1321 can slide within the elongated hole 431 of the frame 104 in a front-rear direction to adjust an amount of tension applied to the belt 118. The tensioner nut 1323 is used to fix the tensioner shaft 1321 at a fixed position within the elongated hole 431 when a desired amount of tension is being applied to the belt 118.

As discussed above with respect to FIGS. 9 and 10, for example, the motor 106 drives the motor pulley 116 which in turn drives the belt 118. When the belt 118 is driven, the first driving pulley 120 and the second driving pulley 122, which are in contact with the belt 118, are driven and rotated. When the first driving pulley 120 and the second driving pulley 122 rotate, the first driving shaft 124 and the second driving shaft 126 rotate. As a result, the first driving gear 128 which is attached to the first driving shaft 124 rotates, and the second driving gear 130 which is attached the second driving shaft 126 rotates. Thus, a single motor (the motor 106) can be used to drive (simultaneously drive) the first driving gear 128 and the second driving gear 130.

Although a preferred embodiment of the present invention discussed above includes the motor pulley 116, the belt 118, the first driving pulley 120, and the second driving pulley 122 to drive the first driving gear 128 and the second driving gear 130 using the motor 106, a gear system including a plurality of gears (e.g., gear with teeth, magnetic gears, etc.) can be used in place of the motor pulley 116, the belt 118, the first driving pulley 120, and the second driving pulley 122 to drive the first driving gear 128 and the second driving gear 130 using the motor 106.

Figure 11:
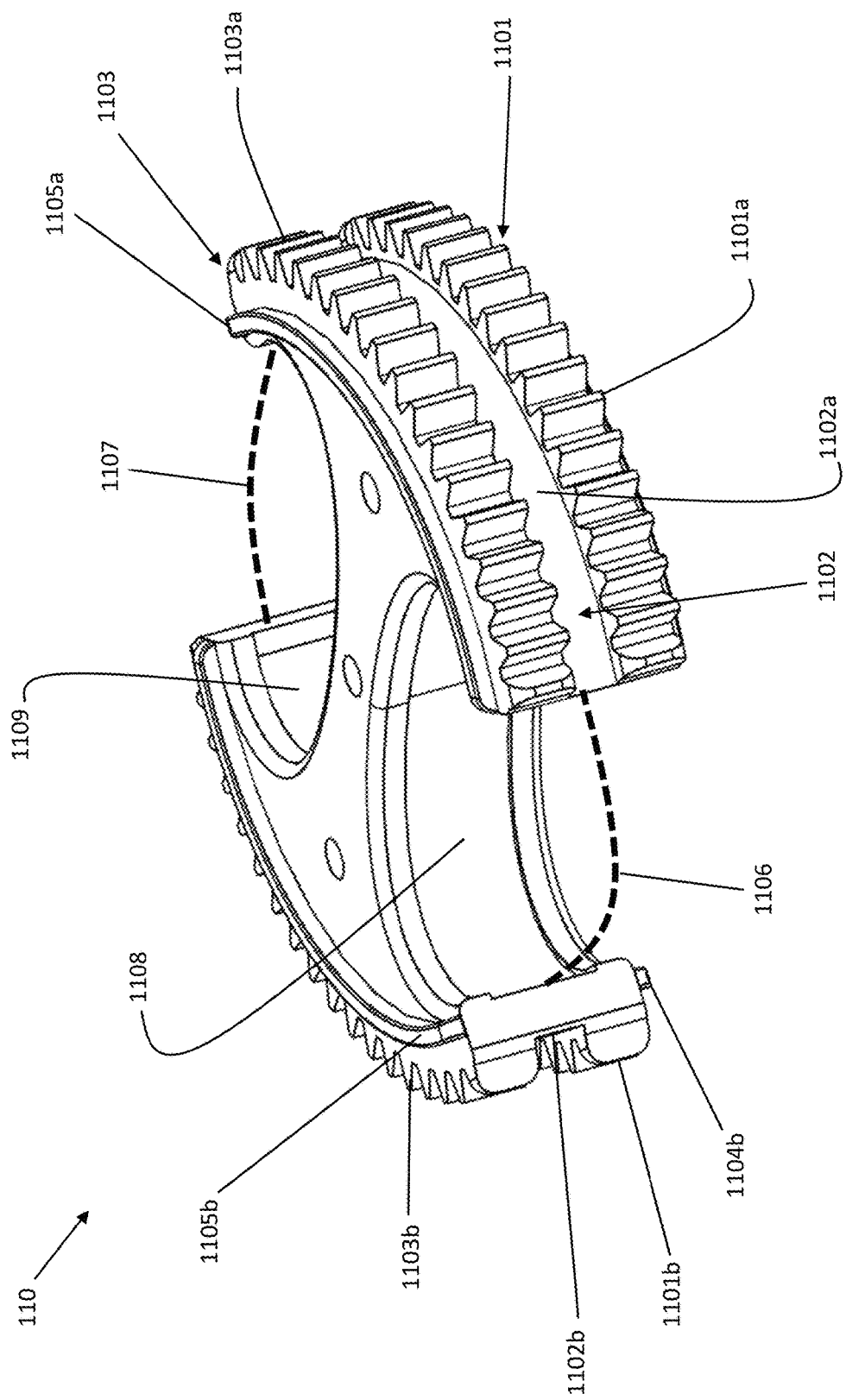
FIG. 11 shows a front perspective view of a main gear included in an agricultural tool according to a preferred embodiment of the present invention.
Figure 12:
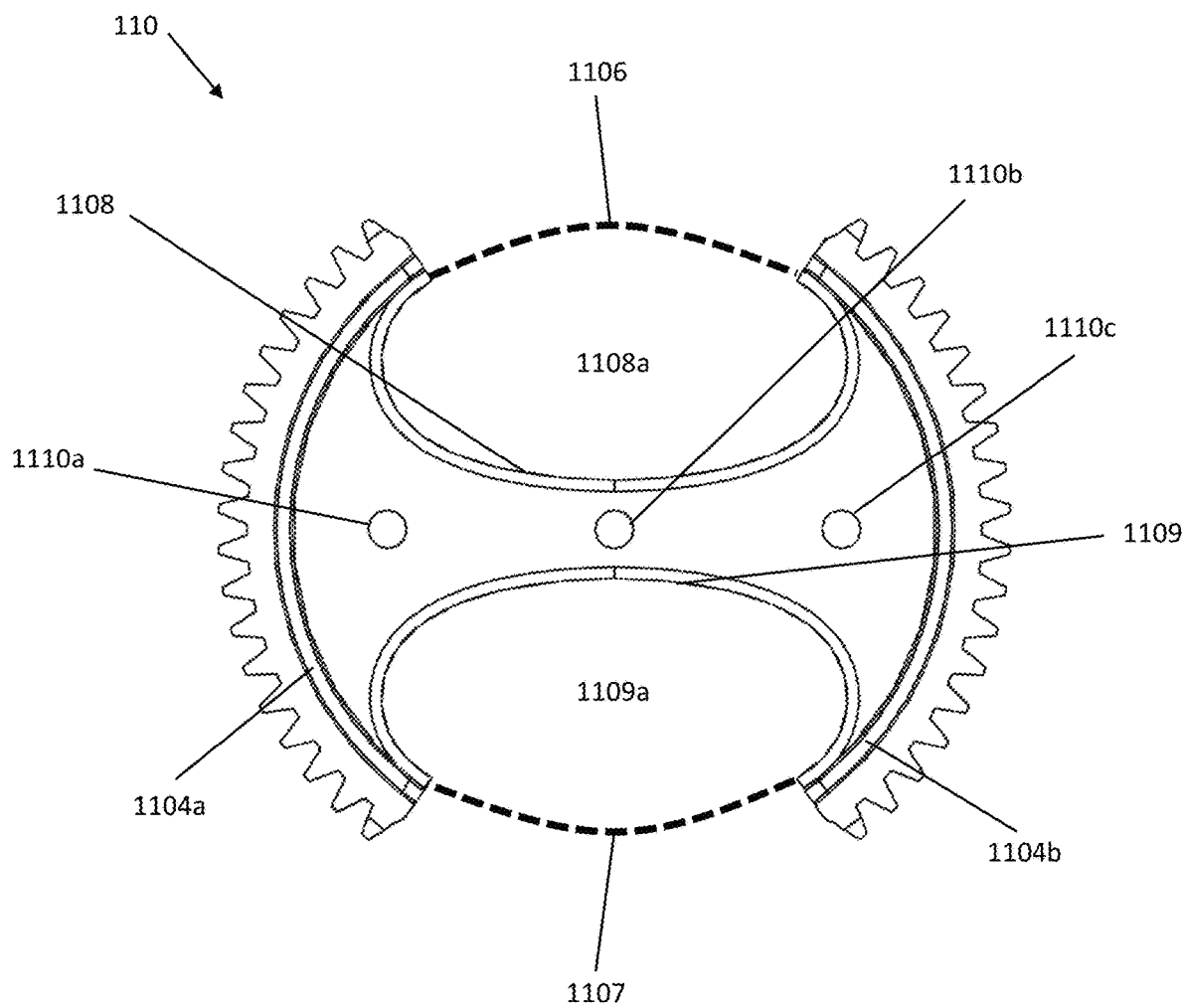
FIG. 12 shows a bottom view of a main gear included in an agricultural tool according to a preferred embodiment of the present invention.

FIG. 11 is a front perspective view of a main gear 110 according to a preferred embodiment of the present invention. FIG. 12 is a bottom view of a main gear 110 according to a preferred embodiment of the present invention. A main gear 110 according to a preferred embodiment of the present invention will be discussed below with respect to FIGS. 11 and 12.

In a preferred embodiment, the main gear 110 includes a plurality of layers. For example, the main gear can include a bottom layer 1101, a center layer 1102, and an upper layer 1103, as shown in FIG. 11. The plurality of layers of the main gear 110 can be fastened together using bolts, screws, or the like that extend through fastening holes of the bottom layer 1101, the center layer 1102, and the upper layer 1103. For example, FIG. 12 shows fastening holes 1110a, 1110b, and 1110c that extend through each of the bottom layer 1101, the center layer 1102, and the upper layer 1103, and FIG. 10 shows an example of a main gear shaft 1111 that extends through fastening holes of the bottom layer 1101, the center layer 1102, and the upper layer 1103 to fix the bottom layer 1101, the center layer 1102, and the upper layer 1103 together.

Preferably, the bottom layer 1101 includes a plurality of teeth portions along a periphery of the bottom layer 1101, and a plurality of openings between the plurality of teeth portions along the periphery of the bottom layer 1101. For example, FIG. 11 shows a preferred embodiment in which the bottom layer 1101 includes a first teeth portion 1101a and a second teeth portion 1101b along the periphery of the bottom layer 1101, and two openings between the first teeth portion 1101a and the second teeth portion 1101b, along the periphery of the bottom layer 1101. In the preferred embodiment shown in FIG. 11, the first teeth portion 1101a and the second teeth portion 1101b each include 18 teeth, for example. Furthermore, although FIG. 11 shows a bottom layer 1101 of the main gear 110 that includes two teeth portions (the first teeth portion 1101a and the second teeth portion 1101b) and two openings, the bottom layer 1101 of the main gear 110 can include three or more teeth portions and openings along the periphery of the bottom layer 1101.

In a preferred embodiment of the present invention, as shown in FIGS. 11 and 12, the main gear 110 includes a bottom track portion 1104 that is attached to a bottom surface of the bottom gear layer 1101. Preferably, the bottom track portion 1104 includes a first bottom track portion 1104a that is attached only to a portion of the bottom surface of the bottom layer 1101 that corresponds to the first teeth portion 1101a. Preferably, the bottom track portion 1104 includes a second bottom track portion 1104b that is attached only to a portion of the bottom surface of the bottom layer 1101 that corresponds to the second teeth portion 1101b. The bottom track portion 1104 extends within the left bottom groove portion 462L and the right bottom groove portion 462R of the frame 104 when the main gear 110 rotates within the frame 104, as discussed in more detail below.

Preferably, the center layer 1102 includes a plurality of curved portions along the periphery of the center layer 1102, and a plurality of openings between the plurality of curved portions, along a periphery of the center layer 1102. For example, FIG. 11 shows a preferred embodiment in which the center layer 1102 includes a first curved portion 1102a and a second curved portion 1102b along the periphery of the center layer 1102, and two openings between the first curved portion 1102a and the second curved portion 1102b, along the periphery of the center layer 1102. Furthermore, although FIG. 11 shows a main gear 110 that includes two curved portions (the first curved portion 1102a and the second curved portion 1102b) and two openings, the center layer 1102 of the main gear can include three or more curved portions and openings along a periphery of the center layer 1102.

Preferably, the upper layer 1103 includes a plurality of teeth portions along the periphery of the upper layer 1103, and a plurality of openings between the plurality of teeth portions, along the periphery of the upper layer 1103. For example, FIG. 11 shows a preferred embodiment of the present invention in which the upper layer 1103 includes a first teeth portion 1103a and a second teeth portion 1103b along the periphery of the upper layer 1103, and two openings between the first teeth portion 1103a and the second teeth portion 1103b, along the periphery of the upper layer 1103. In the preferred embodiment shown in FIG. 11, the first teeth portion 1103a and the second teeth portion 1103b each include 18 teeth, for example. Furthermore, although FIG. 11 shows an upper layer 1103 of the main gear 110 that includes two teeth portions (the first teeth portion 1103a and the second teeth portion 1103b) and two openings, the upper layer 1103 of the main gear 1101 can include three or more teeth portions and openings along a periphery of the upper layer 1103.

In a preferred embodiment of the present invention, as shown in FIG. 11, the main gear 110 includes a top track portion 1105 that is attached to an upper surface of the upper gear layer 1103. Preferably, the top track portion 1105 includes a first top track portion 1105a that is attached only to a portion of the upper surface of the upper layer 1103 that corresponds to the first teeth portion 1103a of the upper layer 1103, and a second top track portion 1105b that is attached only to a portion of the upper surface of the upper layer 1103 that corresponds to the second teeth portion 1103b of the upper layer 1103. The top track portion 1105 extends within the left top groove portion 463L and the right top groove portion 463R of the frame 104 when the main gear 110 rotates within the frame 104, as discussed in more detail below.

In a preferred embodiment of the present invention, the main gear 110 can include the bottom track portion 1104 without including the top track portion 1105. Similarly, in a preferred embodiment, the main gear 110 can include the top track portion 1105 without including the bottom track portion 1104.

In a preferred embodiment of the present invention, and as shown in FIG. 11, a diameter of the bottom layer 1101 and a diameter of the upper layer 1103 are larger than a diameter of the center layer 1102. Thus, a combination of the bottom layer 1101, the upper layer 1103, and the center layer 1102 forms a first channel that corresponds to the first curved portion 1102a and a second channel that corresponds to the second curved portion 1102b. The left track portion 464L and the right track portion 464R of the frame 104 slide within the first channel and the second channel when the main gear 110 rotates within the frame 104.

In a preferred embodiment of the present invention, the openings of the bottom layer 1101, the center layer 1102, and the upper layer 1103 are included in and define a plurality of openings of the main gear 110. For example, as shown in FIGS. 11 and 12, the main gear includes a first opening 1106 and a second opening 1107 along a periphery of the main gear 110.

In a preferred embodiment of the present invention, the first opening 1106 corresponds and is attached to a first receiving space 1108a (see FIG. 12) defined by a first receiving portion 1108, shown in FIG. 11, for example. In a preferred embodiment, the first receiving portion 1108 includes a curved portion and is C-shaped, however the first receiving portion 1108 may have a different shape. Preferably, at least a portion of an inside surface of the first receiving portion 1108 includes rubber or felt.

In a preferred embodiment of the present invention, the second opening 1107 corresponds and is attached to a second receiving space 1109a (see FIG. 12) defined by a second receiving portion 1109, shown in FIG. 11, for example. In a preferred embodiment of the present invention, the second receiving portion 1109 includes a curved portion and is C-shaped, however the second receiving portion 1109 may have a different shape. Preferably, at least a portion of an inside surface of the second receiving portion 1109 includes rubber or felt or a similar material.

In a preferred embodiment of the present invention, the plurality of openings of the main gear 110 along a periphery of the main gear 110 (e.g., the first opening 1106 and the second opening 1107) are equally spaced along the periphery of the main gear 110. However, the plurality of openings of the main gear 110 do not need to be equally spaced along the periphery of the main gear 110. For example, the first opening 1106 and the second opening 1107 can both be located on a same half of the main gear 110 along the periphery of the main gear 110.

In a preferred embodiment of the present invention, the first driving gear 128 and the second driving gear 130 are configured to engage the main gear 110 to drive and rotate the main gear 110 when the motor 106 is driven, as discussed below. As discussed above with respect to FIG. 10, the motor 106 can simultaneously drive the first driving gear 128 and the second driving gear 130. In a preferred embodiment of the present invention, the main gear 110 is driven by both the first driving gear 128 and the second driving gear 130 when each of the first driving gear 128 and the second driving gear 130 is in contact with the main gear 110. For example, when the first driving gear 128 is in contact with the first teeth portion 1101a of the bottom layer 1101 and the first teeth portion 1103a of the upper layer 1103 (or the second teeth portion 1101b of the bottom layer 1101 and the second teeth portion 1103b of the upper layer 1103) and the second driving gear 130 is in contact with the second teeth portion 1101b of the bottom layer 1101 and the second teeth portion 1103b of the upper layer 1103 (or the first teeth portion 1101a of the bottom layer 1101 and the first teeth portion 1103a of the upper layer 1103) the main gear 110 is driven by both the first driving gear 128 and the second driving gear 130.

However, when the first driving gear 128 is not in contact with the main gear 110 (e.g., when the main gear 110 has been rotated such that the first opening 1106 or the second opening 1107 of the main gear 110 faces the first driving gear 128), the main gear 110 can still be driven by the second driving gear 130, which is still in contact with the main gear 110. Similarly, when the second driving gear 130 is not in contact with the main gear 110 (e.g., when the main gear 110 has been rotated such that the first opening 1106 or the second opening 1107 of the main gear 110 faces the second driving gear 130), the main gear 110 can still be driven by the first driving gear 128, which is still in contact with the main gear 110. In this manner, because at least one of the first driving gear 128 and the second driving gear 130 is always in contact with the main gear 110, the motor 106 (a single motor) can continuously drive and rotate the main gear 110 even though the main gear 110 includes the first opening 1106 and the second opening 1107 along the periphery of the main gear 110.

In a preferred embodiment of the present invention discussed above, the first driving gear 128, the second driving gear 130, and the main gear 110 include teeth. However, one or more of the first driving gear 128, the second driving gear 130, and the main gear 110 can be a magnetic gear or another type of gear.

In a preferred embodiment of the present invention, as shown in FIG. 9, the motor 106 can also be used to drive a taping gear 134, which is attached to the motor shaft 1061. For example, the taping gear 134 can be press fit onto the motor shaft 1061 such that the taping gear 134 rotates when the motor shaft 1061 rotates. In a preferred embodiment of the present invention, the taping gear 134 includes 20 teeth, for example.

Figure 13:
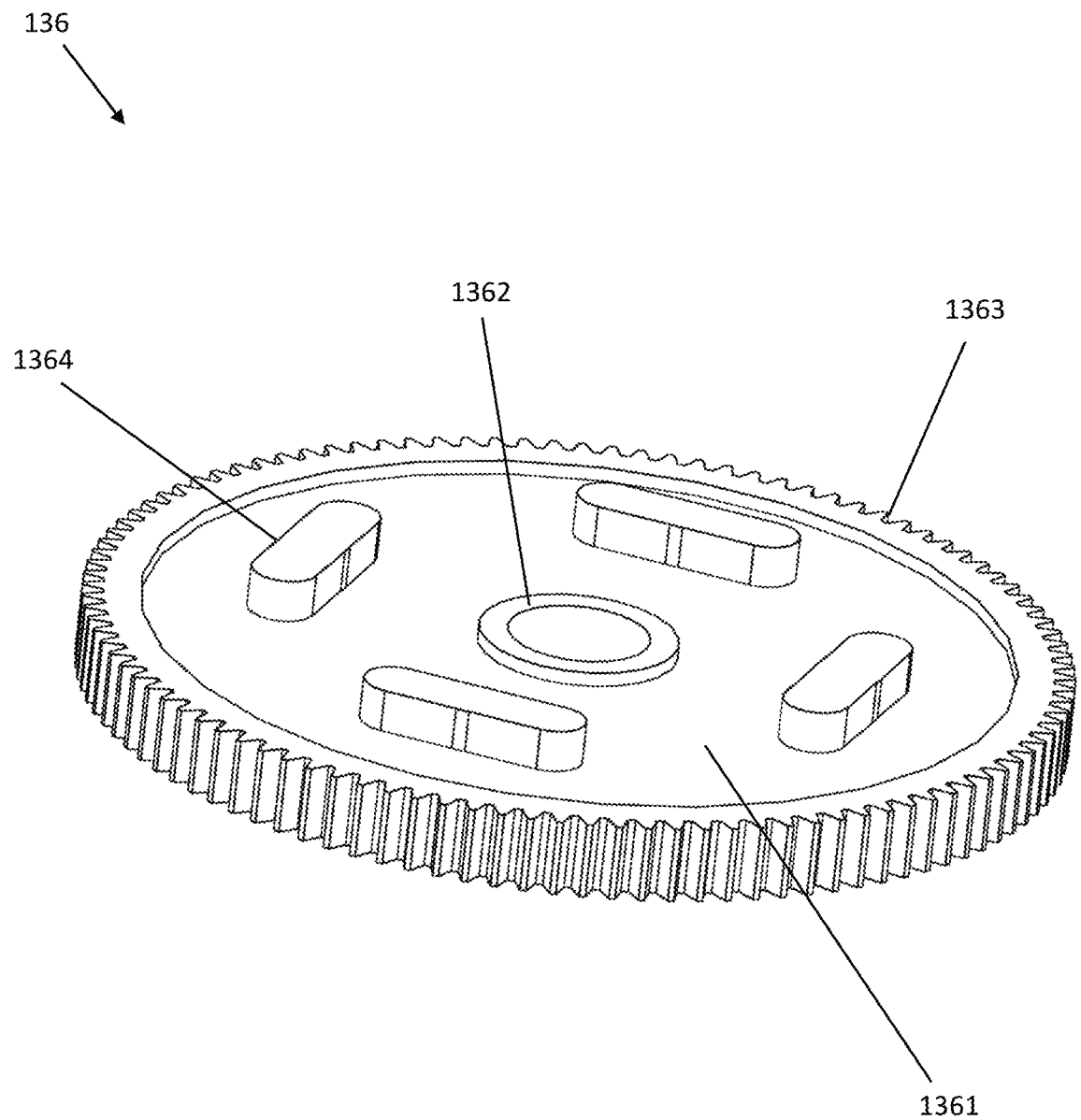
FIG. 13 shows a front perspective view of a base gear included in an agricultural tool according to a preferred embodiment of the present invention.

In a preferred embodiment, a base gear 136 is in contact with and driven by the taping gear 134, as shown in FIG. 9. As shown in FIG. 13, the base gear 136 includes a plate portion 1361, a center hole portion 1362 that includes a center hole that extends through in the plate portion 1361, and a teeth portion 1363 attached to an outer periphery of the plate portion 1361. In a preferred embodiment, the gear shaft 135 shown in FIG. 3 extends through the center hole of the center hole portion 1362. In the preferred embodiment shown in FIG. 13, the teeth portion 1363 includes 105 teeth, for example. Preferably, the teeth portion 1363 extends higher than the plate portion 1361 in the up-down direction, and the center hole portion 1362 extends higher than the plate portion 1361 in the up-down direction. In a preferred embodiment of the present invention, the base gear 136 includes four protrusions 1364 attached to a top surface of the plate portion 1361. The protrusions 1364 shown in FIG. 13 are pill-shaped, but the protrusions 1364 can have a different shape.

In a preferred embodiment of the present invention, as shown in FIG. 9, a timing gear 138 is supported by and connected to the base gear 136, and rotates with the base gear 136. For example, the timing gear 138 includes recesses (not shown) on a bottom surface of the timing gear 138, and the recesses accommodate the protrusions 1364 of the base gear 136 such that the timing gear 138 rotates with the base gear 136.

Figure 14:
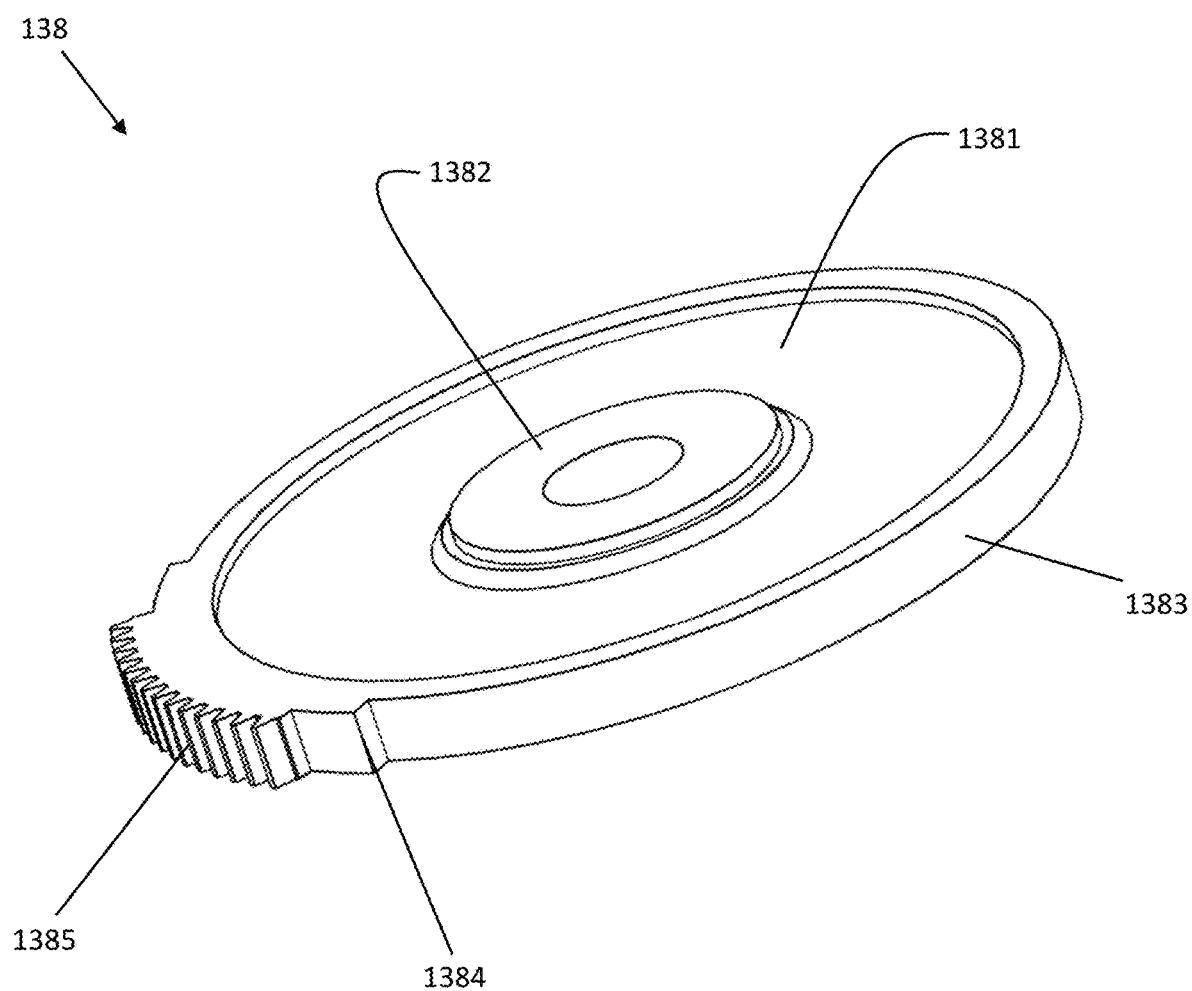
FIG. 14 shows a front perspective view of a timing gear included in an agricultural tool according to a preferred embodiment of the present invention.

In a preferred embodiment, as shown in FIG. 14, the timing gear 138 includes a plate portion 1381, a center hole portion 1382 that includes a center hole that extends through in the plate portion 1381, and an outer edge portion 1383 that is attached to an outer periphery of the plate portion 1381. Preferably, the center hole portion 1382 includes a plurality of steps that extend from the plate portion 1381, and the gear shaft 135 extends through the center hole of the center hole portion 1382. The outer edge portion 1383 can extend higher than the plate portion 1381 in the up-down direction, and the timing gear 138 can include a reinforcement portion 1384 that is attached to a portion of the outer edge portion 1383. The timing gear includes a teeth portion 1385, and the teeth portion 1385 is preferably attached to a portion of the reinforcement portion 1384. Thus, the teeth portion 1385 is only attached to a portion of a periphery of the outer edge portion 1383. In the preferred embodiment shown in FIG. 14, the teeth portion 1385 includes 14 teeth, for example.

Figure 15:
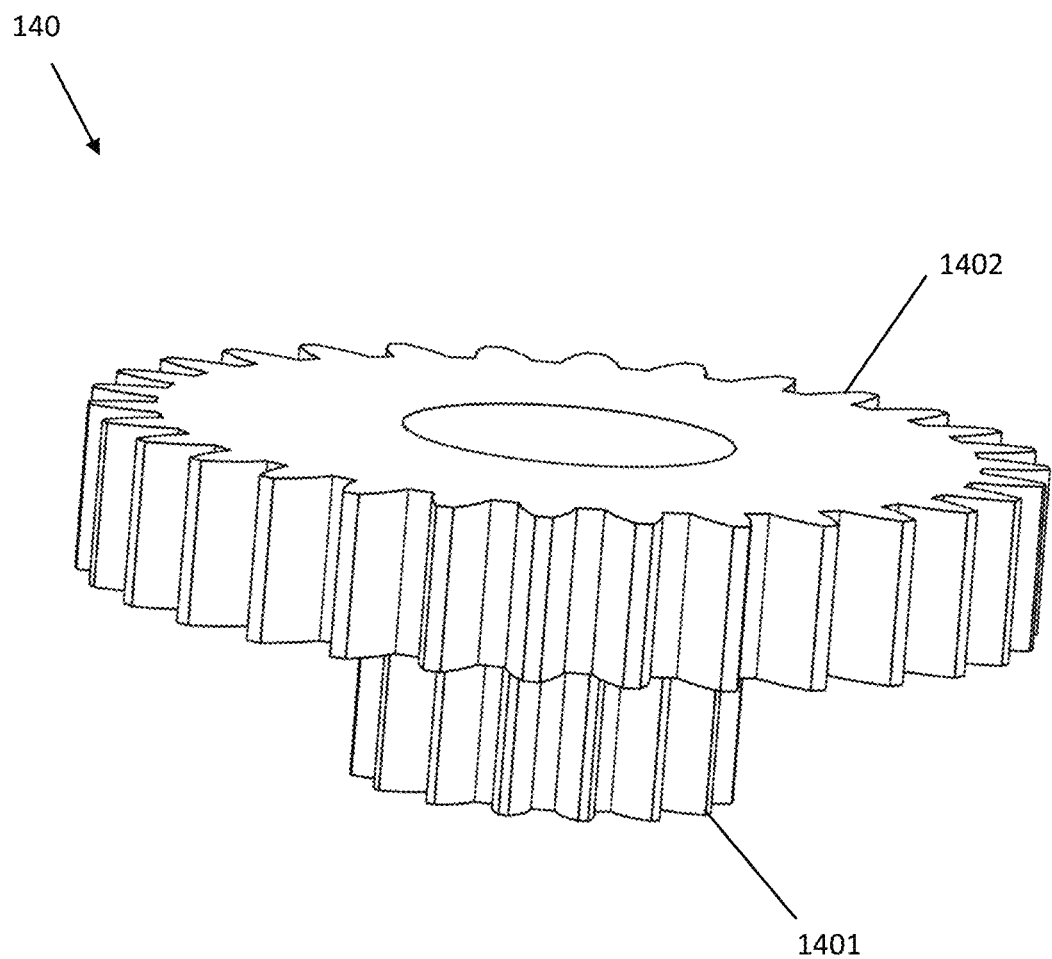
FIG. 15 shows a front perspective view of a linking gear included in an agricultural tool according to a preferred embodiment of the present invention.

In a preferred embodiment of the present invention, the teeth portion 1385 of the timing gear 138 is used to drive and rotate a linking gear 140, as shown in FIG. 9. FIG. 15 shows a linking gear 140 according to a preferred embodiment of the present invention. The linking gear 140 can include a first diameter portion 1401 and a second diameter portion 1402 attached to the first diameter portion 1401. The first diameter portion 1401 can include a first center hole that extends through the first diameter portion 1401, and the first diameter portion 1401 includes teeth that are able to contact and be driven directly by the teeth portion 1385 of the timing gear 138. In the preferred embodiment shown in FIG. 15, the first diameter portion 1401 includes 15 teeth, for example.

In a preferred embodiment, the second diameter portion 1402 is directly attached to the first diameter portion 1401 and rotates with the first diameter portion 1401. For example, the first diameter portion 1401 and the second diameter portion 1402 can be formed from a unitary piece. The second diameter portion 1402 can include a second center hole that is larger than the first center hole of the first diameter portion 1401, and the second center hole can accommodate a linking gear bearing 1403 which is attached to an upper portion of the motor shaft 1061, as shown in FIG. 10. In the preferred embodiment shown in FIG. 15, the second diameter portion 1402 includes 30 teeth, for example.

Figure 16:
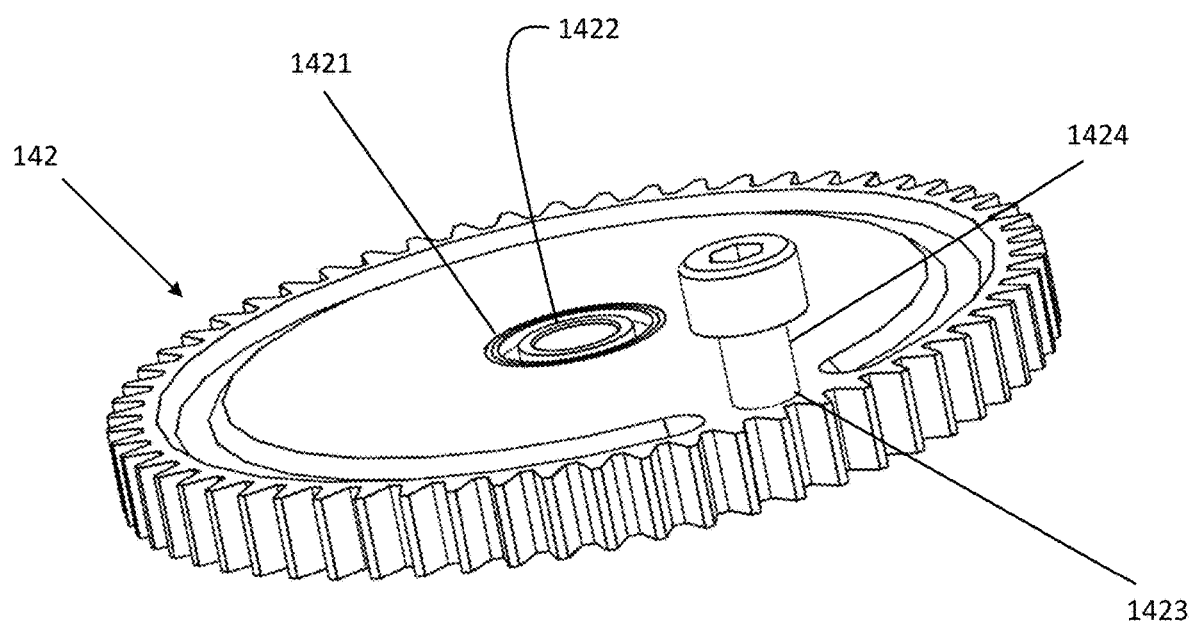
FIG. 16 shows a front perspective view of a sliding arm gear included in an agricultural tool according to a preferred embodiment of the present invention.

In a preferred embodiment, the teeth of the second diameter portion 1402 of the linking gear 140 are in contact with, and used to drive and rotate, a sliding arm gear 142, shown in FIG. 9. Preferably, as shown in FIG. 16, the sliding arm gear 142 includes a center hole 1421 that accommodates a gear shaft bearing 1422 that is attached to an upper portion of the gear shaft 135. Preferably, the sliding arm gear 142 includes a hole 1423 (e.g., a threaded hole) that extends through the sliding arm gear 142. A bolt or shaft 1424 extends through the hole 1423 and is attached to the sliding arm gear 142, such that the bolt or shaft 1424 is fixed to the sliding arm gear 142 and rotates when the sliding arm gear 142 rotates. In a preferred embodiment shown in FIG. 16, the sliding arm gear includes 60 teeth, for example.

In a preferred embodiment of the present invention discussed above, the taping gear 134, the base gear 136, the timing gear 138, the linking gear 140, and the sliding arm gear 142 include teeth. However, one or more of the taping gear 134, the base gear 136, the timing gear 138, the linking gear 140, and the sliding arm gear 142 can be a magnetic gear or another type of gear.

Figure 17:
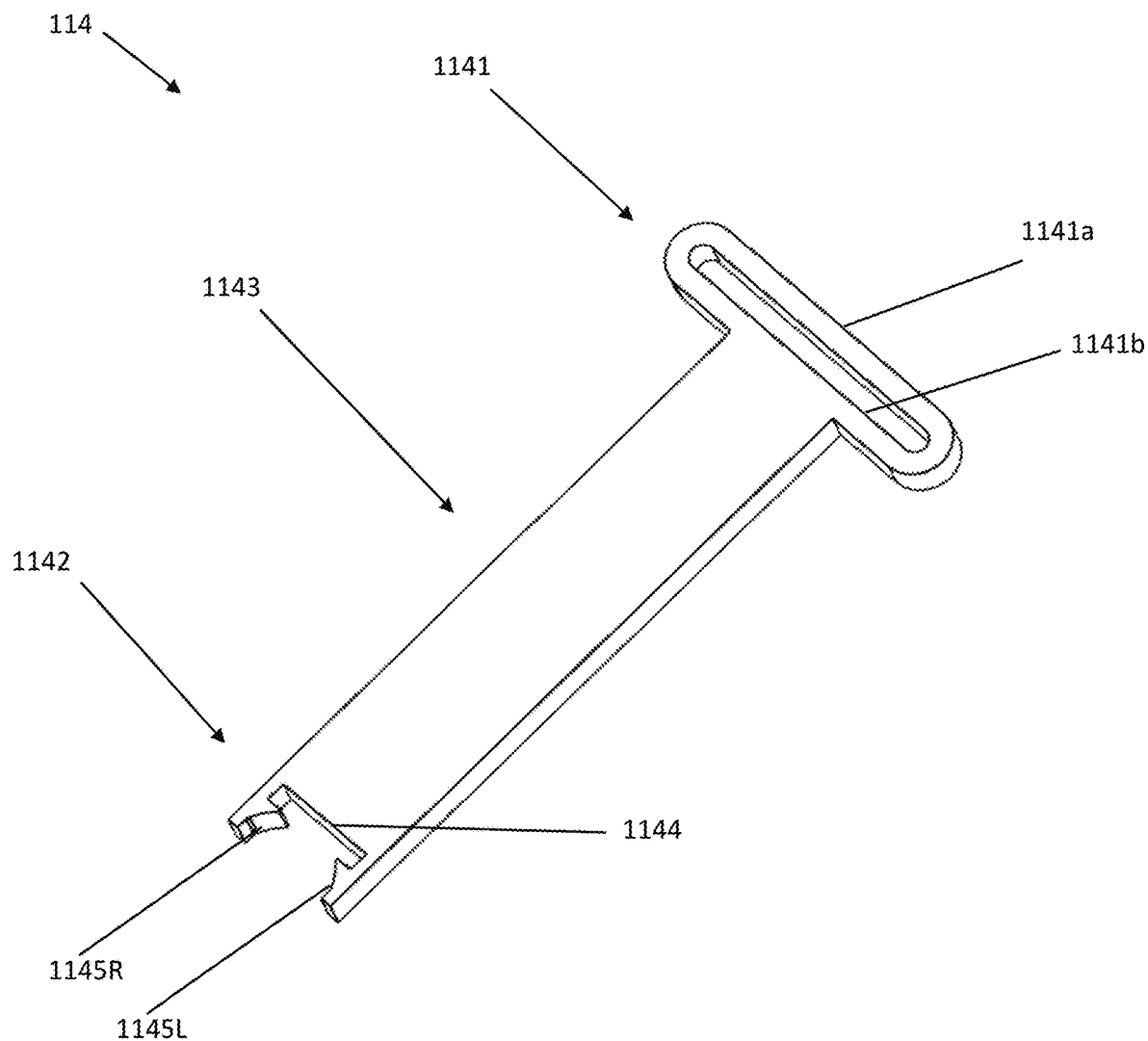
FIG. 17 shows a front perspective view of a sliding arm included in an agricultural tool according to a preferred embodiment of the present invention.

As shown in FIGS. 9 and 17, the sliding arm 114 includes a first end portion 1141 connected to a second end portion 1142 by a main body portion 1143. The first end portion 1141 includes a horizontal base portion 1141a including an elongated hole 1141b that extends in a left-right direction and through which the bolt or shaft 1242 fixed to the sliding arm gear 142 extends, so as to attach the sliding arm 114 to the sliding arm gear 142. The main body portion 1143 of the sliding arm 114 is slidingly supported by the first sliding arm support portion 1042 and the second sliding arm support portion 1044 of the frame 104, shown in FIGS. 1 and 6, for example. In a preferred embodiment of the present invention, the sliding arm 114 is T-shaped.

As shown in FIG. 17, the second end portion 1142 of the sliding arm 114 can include a holder configured to hold a clip 146, discussed in more detail below. Preferably, the holder includes a base recess 1144 configured to hold a base portion 1461 of the clip 146, and clip arm portions 1145L and 1145R configured to hold arm portions of the clip 146. In a preferred embodiment, the clip arm portions 1145L and 1145R are curved to hold an arm portions of the clip 146.

In a preferred embodiment of the present invention, a combination of the sliding arm gear 142, the bolt or shaft 1424, and the sliding arm 114 form a Scotch Yoke mechanism. A Scotch Yoke mechanism, also known as slotted link mechanism, is a reciprocating motion mechanism that converts a rotational motion into a linear motion of a slider, or vice versa. In a preferred embodiment of the present invention, the rotational motion of the sliding arm gear 142 and the bolt or shaft 1424 attached thereto is converted into a linear motion of the sliding arm 114 in a front-rear direction of the agricultural tool 100. More specifically, as the sliding arm gear 142 and the bolt or shaft 1424 rotate, the bolt or shaft 1424 slides within the elongated hole 1411b of the sliding arm 114 which causes the sliding arm 114 to move in a forward-rearward direction.

In a preferred embodiment, the sliding arm 114 is moved in a forward-rearward direction between a retracted position (e.g., a rearmost position of the sliding arm 114) and a deployed position (e.g., a forwardmost position of the sliding arm). Preferably, the holder of the sliding arm 114 is located on (directly above) the clip platform portion 443 of the second sliding arm support portion 1044 shown in FIG. 6 when the sliding arm 114 is in the retracted position, and the holder of the sliding arm 114 is located forward of, and extending beyond, the clip platform portion 443 of the second sliding arm support portion 1044 when the sliding arm 114 is in the deployed position.

Figure 18:
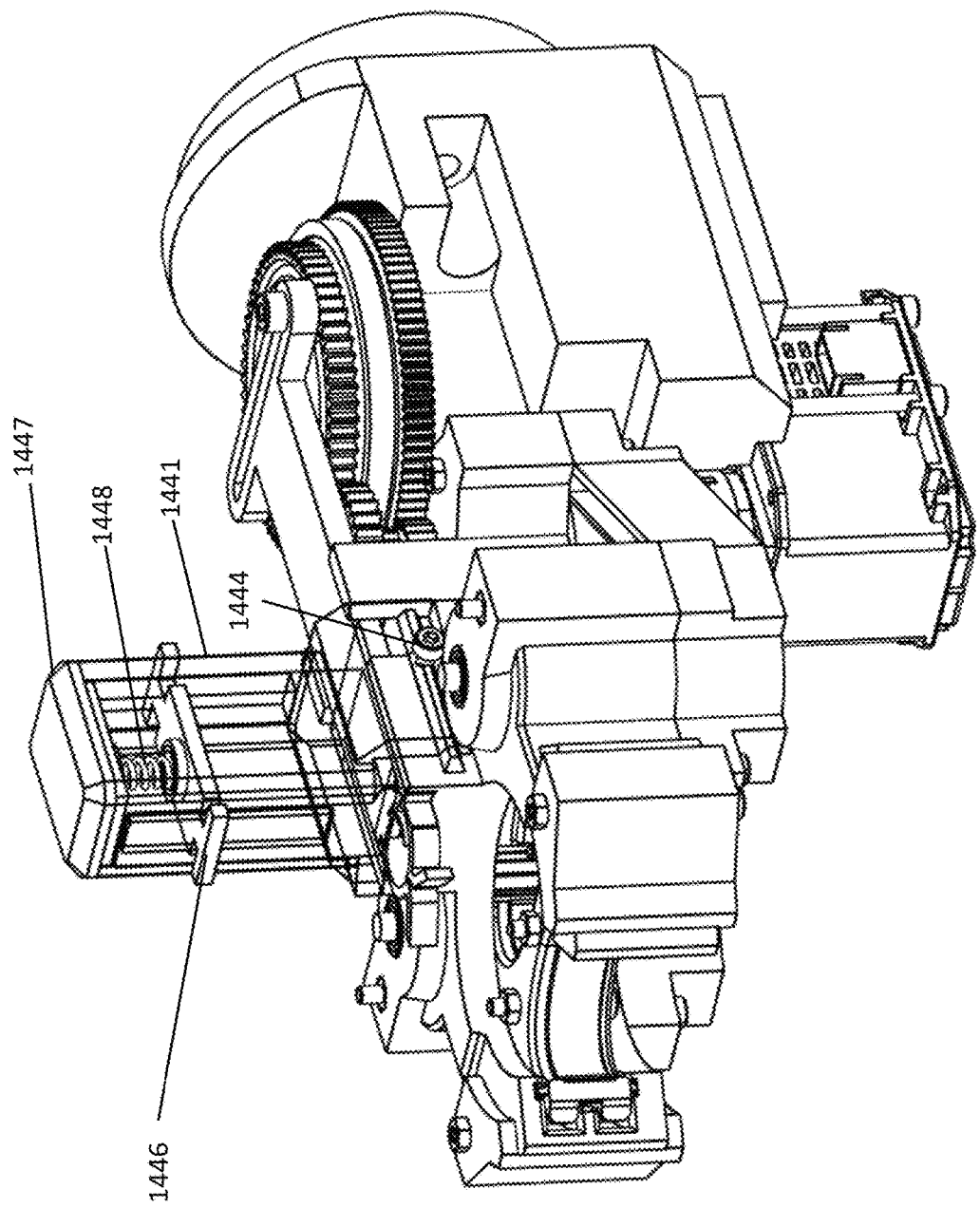
FIG. 18 shows a front perspective view of an agricultural tool according to a preferred embodiment of the present invention in which a main body and an attachment portion of a magazine are transparent to facilitate illustration of the magazine.

In a preferred embodiment of the present invention, the agricultural tool 100 includes a magazine 144, as shown in FIG. 9, for example. The magazine 144 is configured to house/hold one or more clips 146, as discussed in more detail below. Preferably, the magazine 144 includes a main body 1441 configured to house the plurality of clips, and an attachment portion 1442 attached to a bottom of the main body 1441. FIG. 18 shows a preferred embodiment of the present invention in which the main body 1441 and the attachment portion 1442 of the magazine 114 are made transparent to facilitate illustration of the magazine 114.

Figure 19:
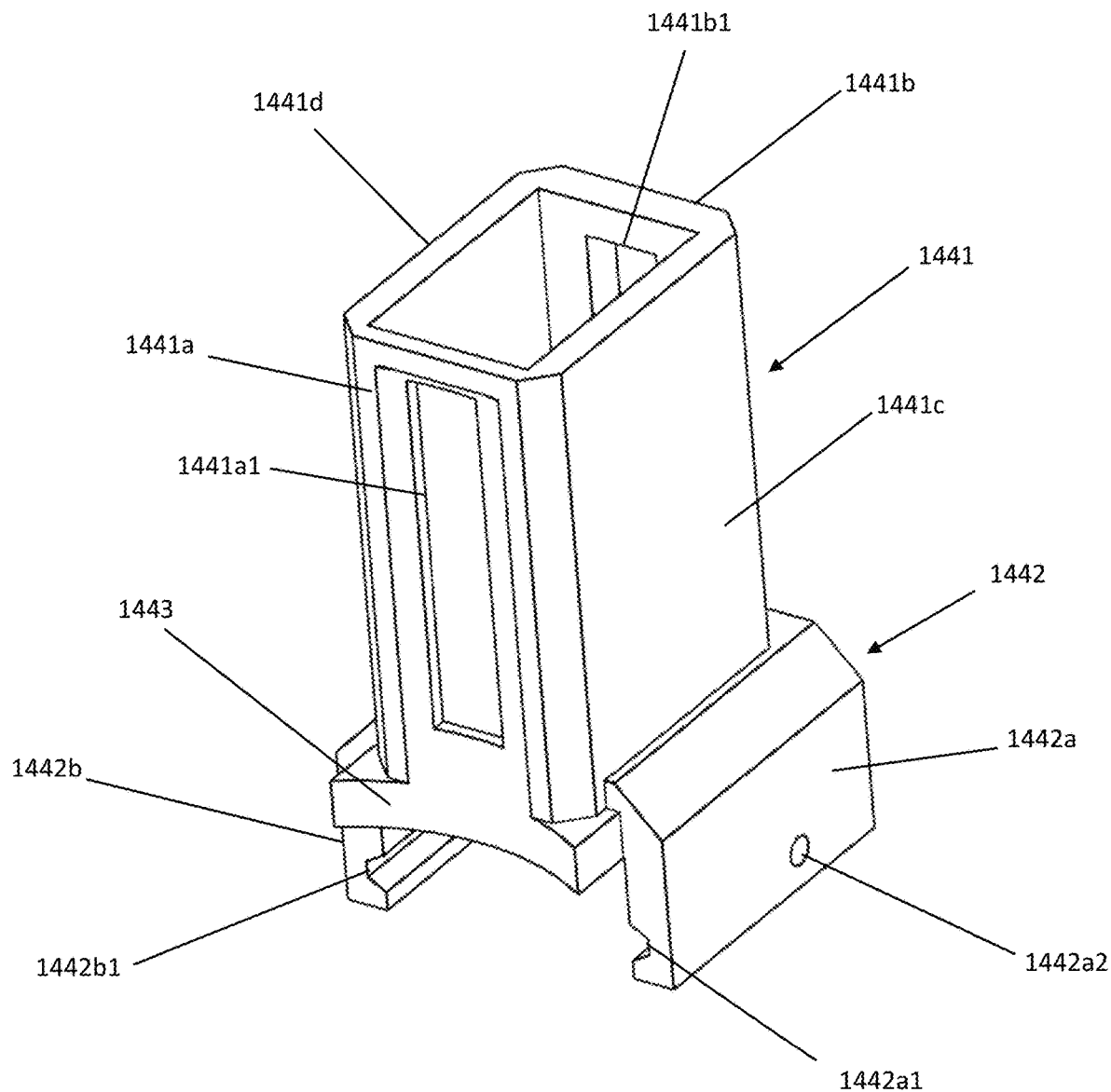
FIG. 19 shows a front perspective view of a main body and an attachment portion of a magazine included in an agricultural tool according to a preferred embodiment of the present invention.

FIG. 19 shows the main body 1441 and the attachment portion 1442 of the magazine 144. Preferably, the main body 1441 includes a front wall 1441a, a rear wall 1441b, a left wall 1441c, a right wall 1441d, and a curved portion 1443 at the bottom of main body 1441 (e.g., at a bottom of the front wall 1441a). The front wall 1441a can include a front vertical window 1141a1 that extends through the front wall 1441a and extends in an up-down direction. The rear wall 1441b can include a rear vertical window 1441b1 that extends through the rear wall 1441b and extends in an up-down direction.

The attachment portion 1442 can include a left wall 1442a and a right wall 1442b. The left wall 1442a can include a left sliding groove 1442a1 to accommodate the left magazine slide track 444 of the frame 104. The left wall 1442a can include a left fixing hole 1442a2 that extends through the left wall 1442a in a left-right direction and is located in a same location as the left sliding groove 1442a1 in an up-down direction so as to intersect the left sliding groove 1442a1. The right wall 1442b can include a right sliding groove 1442b1 to accommodate the right magazine slide track 446 of the frame 104, and the right wall 1442b includes a right fixing hole (not shown) that extends through the right wall 1442 in a left-right direction and is located in a same location as the right sliding groove 1442b1 in an up-down direction so as to intersect the right sliding groove 1442b1.

The left magazine slide track 444 of the frame 104 can slide within the left sliding groove 1442a1, and the right magazine slide track 446 of the frame 104 can slide within the right sliding groove 1442b1, such that the frame 104 can slidingly support that magazine 144. In a preferred embodiment of the present invention, a left magazine fixing bolt 1444 shown in FIG. 18 can extend through the left fixing hole 1442a2 and the hole 445 (see FIG. 6, for example) to fix the magazine 144 to the frame 104. Similarly, a right magazine fixing bolt (not shown) can extend through the right fixing hole (not shown) and the hole 447 to fix the magazine 144 to the frame 104.

Figure 20:
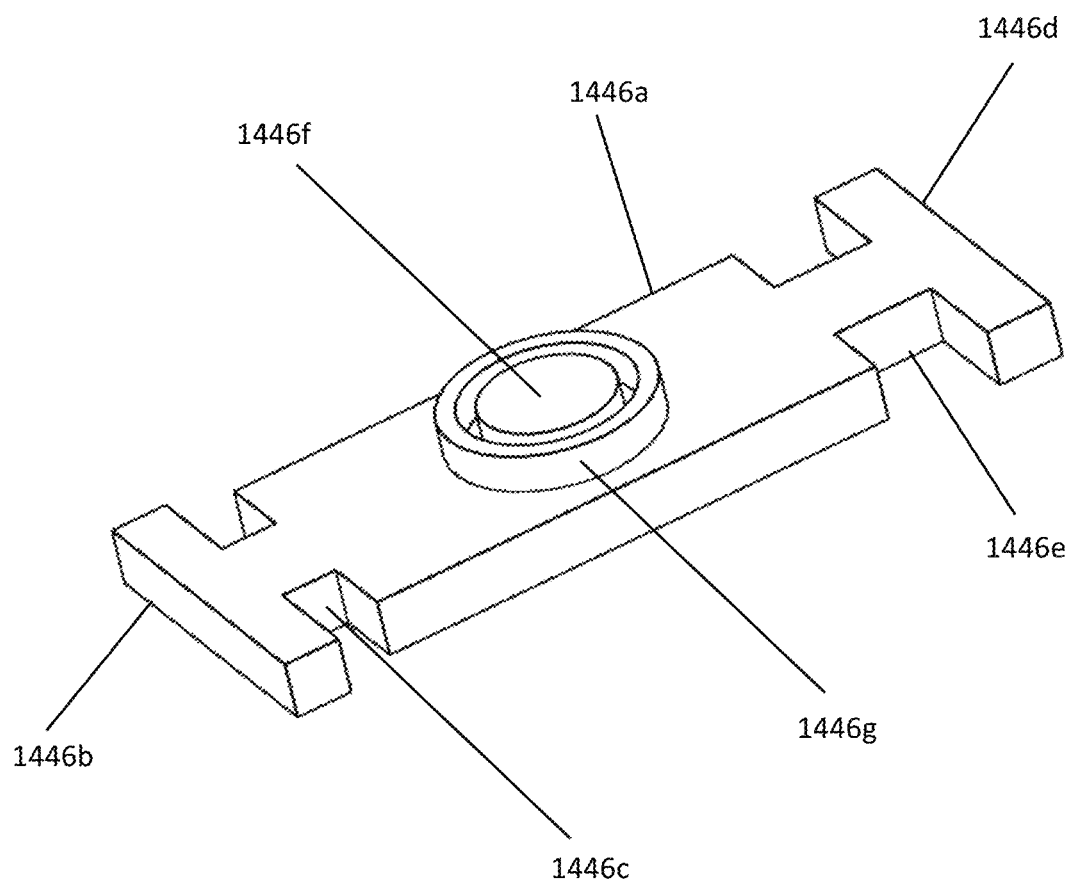
FIG. 20 shows a front perspective view of a push plate included in an agricultural tool according to a preferred embodiment of the present invention.

In a preferred embodiment of the present invention, as shown in FIG. 18, for example, the magazine 144 can include a push plate 1446 that slides within the main body 1441 of the magazine 144 in an up-down direction. As shown in FIGS. 18 and 20, the push plate can include a main plate 1446a connected to a front guide tab 1446b by a front connection portion 1446c and to a rear guide tab 1446d by a rear connection portion 1446e. The front connection portion 1446c can extend through the front vertical window 1141a1 and the rear connection portion 1446e can extend through the rear vertical window 1441b1. Preferably, the push plate 1446 includes a spring protrusion portion which includes a disk portion 1446f and a ring portion 1446g. The disk portion 1446f is attached to a top surface of the main plate and the ring portion 1446g surrounds the disk portion 1446f.

Figure 21:
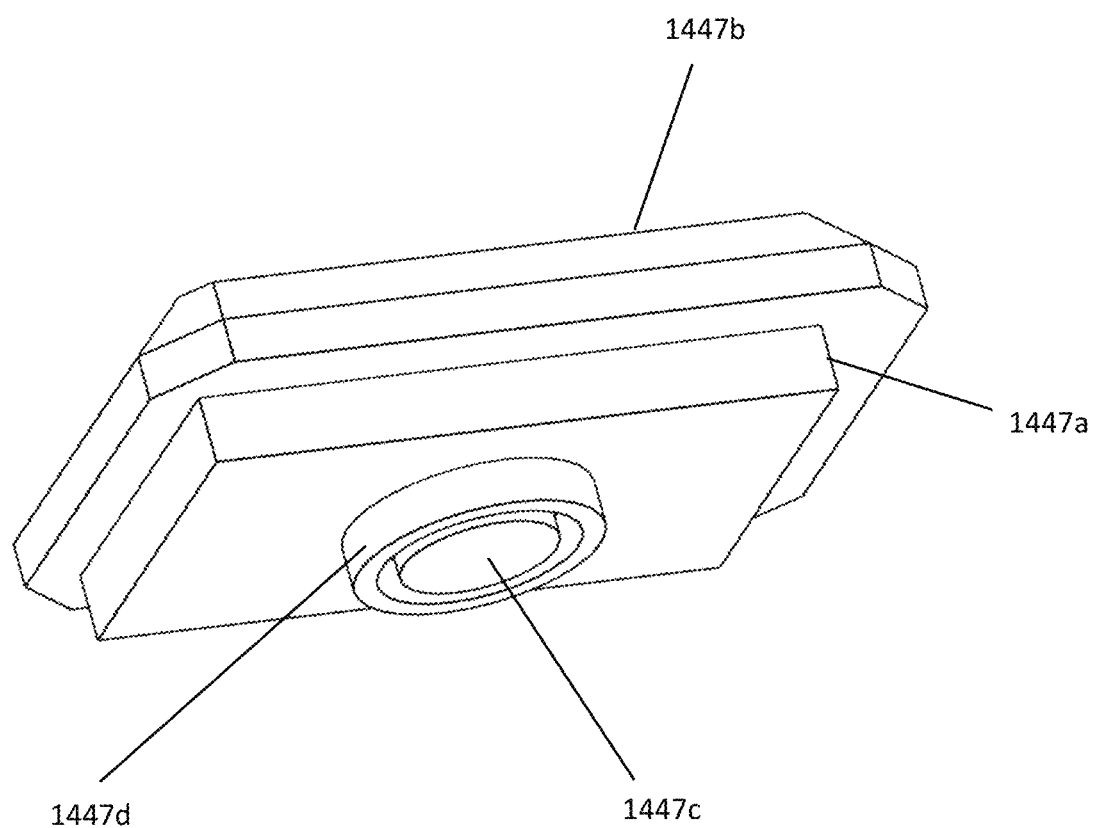
FIG. 21 shows a front perspective view of a magazine cap included in an agricultural tool according to a preferred embodiment of the present invention.

In a preferred embodiment of the present invention, as shown in FIG. 18, for example, the magazine 144 includes a magazine cap 1447. Preferably, the magazine cap 1447 includes a lower portion 1447a and an upper portion 1447b attached to the lower portion 1447a, as shown in FIG. 21. Preferably, the lower portion 1447a is rectangularly shaped and is configured to fit within an upper portion of the main body 1441 of the magazine 114. In a preferred embodiment, the magazine cap 1447 includes a spring protrusion portion that is attached to a lower surface of the lower portion 1447a. The spring protrusion can include a disk portion 1447c and a ring portion 1447d that surrounds the disk portion 1447c.

In a preferred embodiment of the present invention, the magazine 144 includes a magazine spring 1448, as shown in FIG. 18, for example. Preferably, an upper end of the magazine spring 1448 is held within the spring protrusion portion of the magazine cap 1447 and a lower end of the magazine spring 1448 is held within the spring protrusion portion of the push plate 1446. The magazine spring 1448 pushes the push plate 1446 away from the magazine cap 1447 and towards the clip platform 443 of the frame 104 when the magazine 144 is attached to the frame 104, as shown in FIG. 18, for example. A preferred embodiment of the present invention can also include a biasing or elastic member other than the magazine spring 1448 to bias the push plate 1446 towards the clip platform 443.

In a preferred embodiment of the present invention, as discussed above, the magazine 144 is configured to hold one or more clips 146 within the main body 1441. The push plate 1446, which is pushed away from the magazine cap 1447 by the magazine spring 1448, applies a downward force to the one or more clips 146 housed within the magazine 144. More specifically, the one or more clips 146 are pushed downwards towards the clip platform portion 443 of the second sliding arm support portion 1044 of the frame 104. In a preferred embodiment of the present invention, when the sliding arm 114 is moved to the retracted position (e.g., a rearmost position of the sliding arm 114), a bottommost clip included in the one or more clips 146 being pushed downwards towards the clip platform portion 443 is attached to the holder of the sliding arm 114, which is located on (directly above) the clip platform portion 443, by the downward force applied by the push plate 1446.

Figure 22:
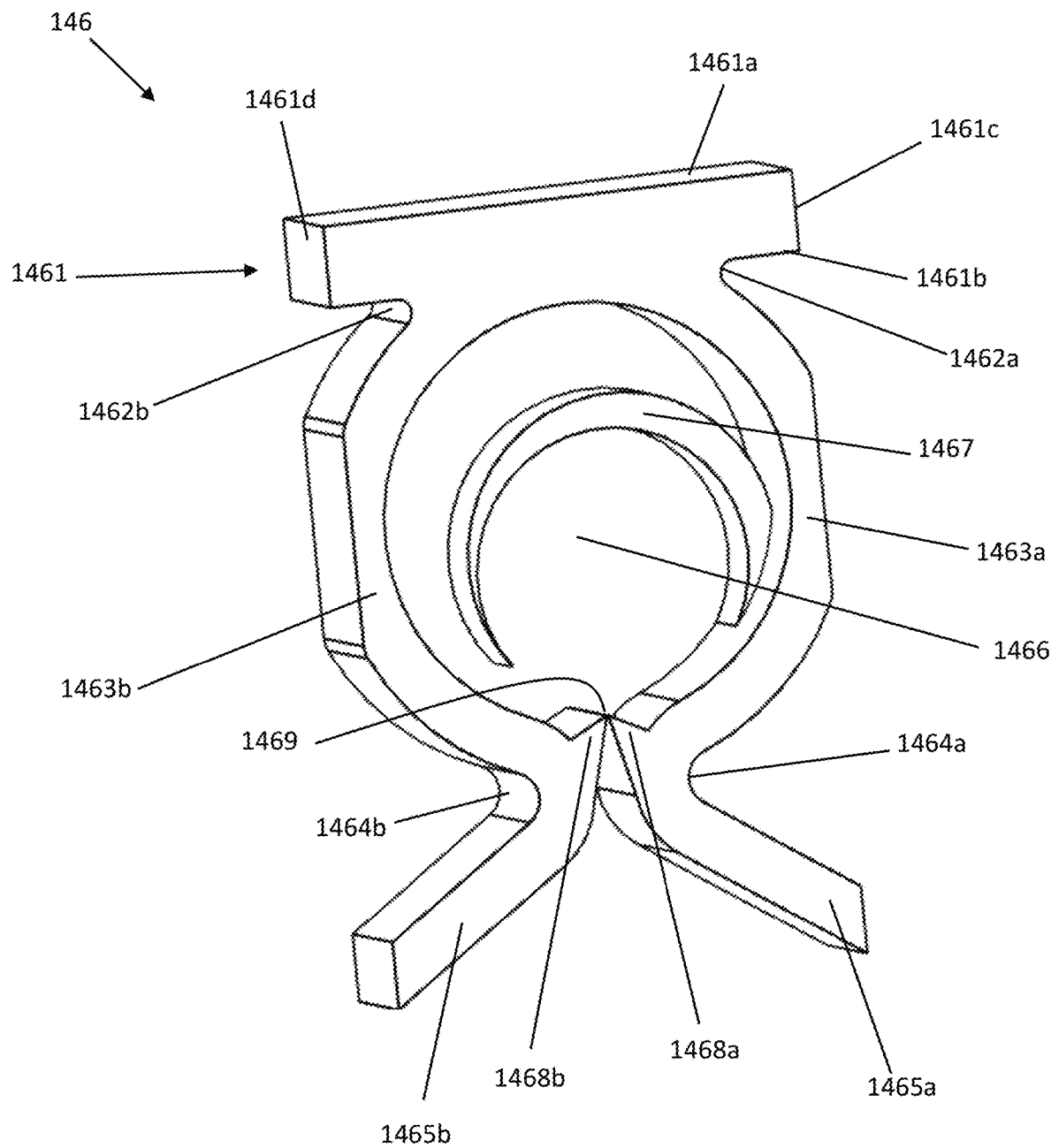
FIG. 22 shows a clip according to a preferred embodiment of the present invention.

FIG. 22 shows a clip 146 according to a preferred embodiment of the present invention. Preferably, the clip 146 includes a base portion 1461 including a rear wall surface 1461a, a front wall surface 1461b, a left wall surface 1461c, and a right wall surface 1461d. Preferably, the base portion 1461 is rectangularly shaped.

The clip 146 can include a left arm portion including a first left portion 1463a and a second left portion 1465a connected to the first left portion 1463a by a left tapered portion 1464a. Preferably, the first left portion 1463a is curved and includes a flat outer surface, and the left arm portion (the first left portion 1463a) is connected to the base portion 1461 (the front wall surface 1461b) by a left connection portion 1462a. In a preferred embodiment, the left connection portion 1462a defines a curved recess.

Preferably, the second left portion 1465a includes a first end attached to the left tapered portion 1464a and a second end which is a free end. The second left portion 1465a extends diagonally outward from the first end towards the second end, and the second end of the second left portion 1465a includes a flat outer surface.

Preferably, the clip 146 can include a right arm portion including a first right portion 1463b and a second right portion 1465b connected to the first right portion 1463b by a right tapered portion 1464b. Preferably, the first right portion 1463b is curved and includes a flat outer surface, and the right arm portion (the first right portion 1463b) is connected to the base portion 1461 (the front wall surface 1461b) by a right connection portion 1462b. In a preferred embodiment, the right connection portion 1462b defines a curved recess.

Preferably, the second right portion 1465b includes a first end attached to the right tapered portion 1464b and a second end which is a free end. The second right portion 1465b extends diagonally outward from the first end towards the second end, and the second end of the second right portion 1465b includes a flat outer surface.

Figure 23:
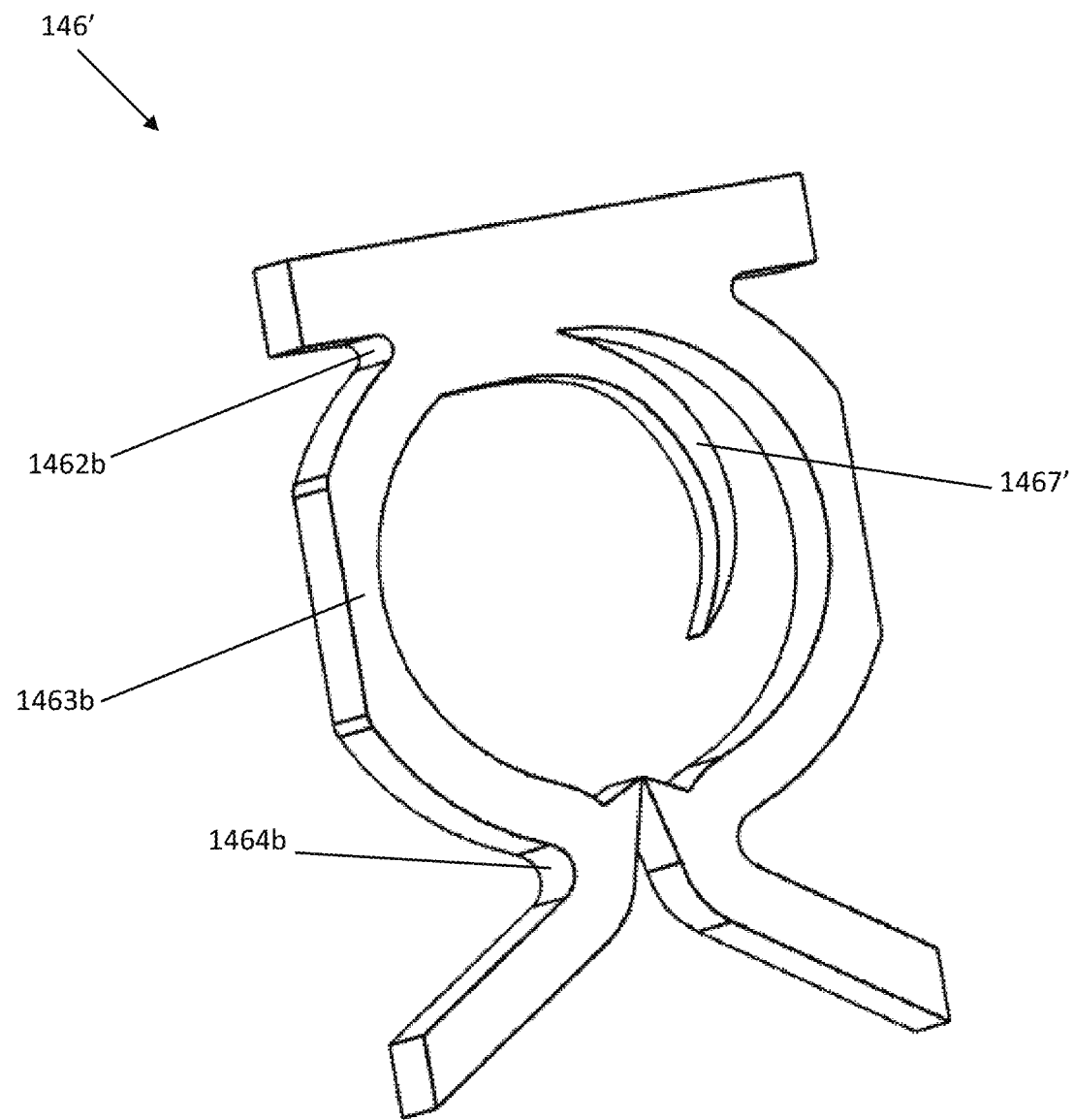
FIG. 23 shows a clip according to another preferred embodiment of the present invention.

In a preferred embodiment, the first left portion 1463a and the first right portion 1463b define a clip receiving space 1466. A curved protrusion 1467 can be located within the clip receiving space 1466. In the preferred embodiment shown in FIG. 22, the curved protrusion 1467 includes a first end attached to the first left portion 1463a at a position located closer to the left tapered portion 1464a than to the left connection portion 1462a, and a second end which is a free end that protrudes/cantilevers into the clip receiving space 1466. However, the first end of the curved protrusion 1467 does not need to be attached to the first left portion 1463a, and the first end of the curved protrusion 1467 can instead be attached to the first right portion 1463b or another portion of the clip 146. For example, FIG. 23 shows a clip 146' according to a preferred embodiment of the present invention in which the first end of the curved protrusion 1467' is attached to the first right portion 1463b at a position located closer to the right connection portion 1462b than the right tapered portion 1464b.

In a preferred embodiment of the present invention, the curved protrusion 1467 is configured to contact and hold an agricultural item of interest A when the clip 146 is attached to the agricultural item of interest A. As discussed in more detail below, an agricultural item of interest A can be a grape vine cane, a branch, a stem, a vine or another object. In a preferred embodiment, the second end of the curved protrusion 1467 protrudes/cantilevers into the clip receiving space 1466 so that the curved protrusion 1467 is configured to be flexible and able to bend if the agricultural item of interest A, such as a grape vine cane, grows when the clip 146 is attached to the agricultural item of interest A. For example, the curved protrusion 1467 is able to bend when a diameter of an agricultural item of interest A, such as a grape vine cane, increases so that the curved protrusion 1467 can more securely hold the agricultural item of interest A as the agricultural item of interest A grows.

In a preferred embodiment of the present invention, as shown in FIG. 22, for example, the left wall surface 1461c of the base portion 1461, the flat outer surface of the first left portion 1463a, and the flat outer surface of the second end of the second left portion 1465a are coplanar, and abut an inside surface of the left wall 1441c of the main body 1441 of the magazine 144 when the clip 146 is housed within the magazine 144. Similarly, the right wall surface 1461d of the base portion 1461, the flat outer surface of the first right portion 1463b, and the flat outer surface of the second end of the second right portion 1465b are coplanar, and abut an inside surface of the right wall 1441d of the main body 1441 of the magazine 144 when the clip 146 is housed within the magazine 144.

In a preferred embodiment of the present invention, as shown in FIG. 22, for example, the first left portion 1463a can include a middle portion located between the connection portion 1462a and the tapered portion 1464a that is thinner than a rear portion of the first left portion 1463a which is located closer to the connection portion 1462a than to the tapered portion 1464a. The middle portion of the first left portion 1463a is also thinner than a forward portion of the first left portion 1463a which is located closer to the tapered portion 1464a than to the connection portion 1462a.

Similarly, in the preferred embodiment shown in FIG. 22, the first right portion 1463b can include a middle portion, which is located between the right connection portion 1462b and the right tapered portion 1464b, and that is thinner than a rear portion of the first right portion 1463b which is located closer to the right connection portion 1462b than to the right tapered portion 1464b. The middle portion of the first right portion 1463b is also thinner than a forward portion of the first right portion 1463b which is located closer to the right tapered portion 1464b than to the right connection portion 1462b.

In a preferred embodiment of the present invention, as shown in FIG. 22, for example, the left arm portion of the clip 146 includes a left protrusion 1468a attached to the first left portion 1463a. However, the left protrusion 1468a may be attached to one or more of the first left portion 1463a, the left tapered portion 1464a, and the second left portion 1465a. In FIG. 22, the left protrusion 1468a includes a base attached to the first left portion 1463a and a main body that extends inwardly (towards the clip receiving space 1466) from the base to a tip of the left protrusion 1468a.

In a preferred embodiment, the right arm portion of the clip 146 includes a right protrusion 1468b attached to the first right portion 1463b. However, the right protrusion 1468b may be attached to one or more of the first right portion 1463b, the right tapered portion 1464b, and the second right portion 1465b. In FIG. 22, the right protrusion 1468b includes a base attached to the first right portion 1463b and a main body that extends inwardly (toward the clip receiving space 1466) from the base to a tip of the right protrusion 1468b.

In a preferred embodiment of the present invention, a space 1469 is located between the tip of the left protrusion 1468a and the tip of the right protrusion 1468b. In a preferred embodiment, the space 1469 defines an opening of the clip receiving space 1466.

In a preferred embodiment of the present invention, the holder included in the second end portion 1142 of the sliding arm 114 is configured to hold the clip 146. More specifically, the base recess 1144 of the sliding arm 114 can be configured to hold the base portion 1461 of the clip 146, the clip arm portion 1145L of the sliding arm 114 can be configured to hold the first left portion 1463a of the clip 146, and the clip arm portion 1145R of the sliding arm 114 can be configured to hold the first right portion 1463b of the clip 146.

As discussed above, in a preferred embodiment of the present invention, the push plate 1446, which is pushed away from the magazine cap 1447 by the magazine spring 1448, applies a downward force to the one or more clips 146 housed within the magazine 144 to push the one or more clips 146 downwards towards the clip platform portion 443 of the second sliding arm support portion 1044 of the frame 104. In a preferred embodiment of the present invention, the push plate 1446 pushes the one or more clips 146 downwards towards the clip platform portion 443 of the second sliding arm support portion 1044 such that a bottommost clip of the one or more clips 146 housed within the magazine is positioned such that the base recess 1144 of the sliding arm 114 holds the base portion 1461 of the clip 146, the clip arm portion 1145L of the sliding arm 114 holds the first left portion 1463a of the clip 146, and the clip arm portion 1145R of the sliding arm 114 holds the first right portion 1463b of the clip 146 when the sliding arm 114 is in a retracted position.

In a preferred embodiment of the present invention, the agricultural tool 100 can be used to perform a plurality of tasks, including, but not limited to, tying/twisting an agricultural item of interest A and a support structure S together, and fastening or attaching the agricultural item of interest A to the support structure S using a clip, such as the clip 146 described above.

Figure 24:
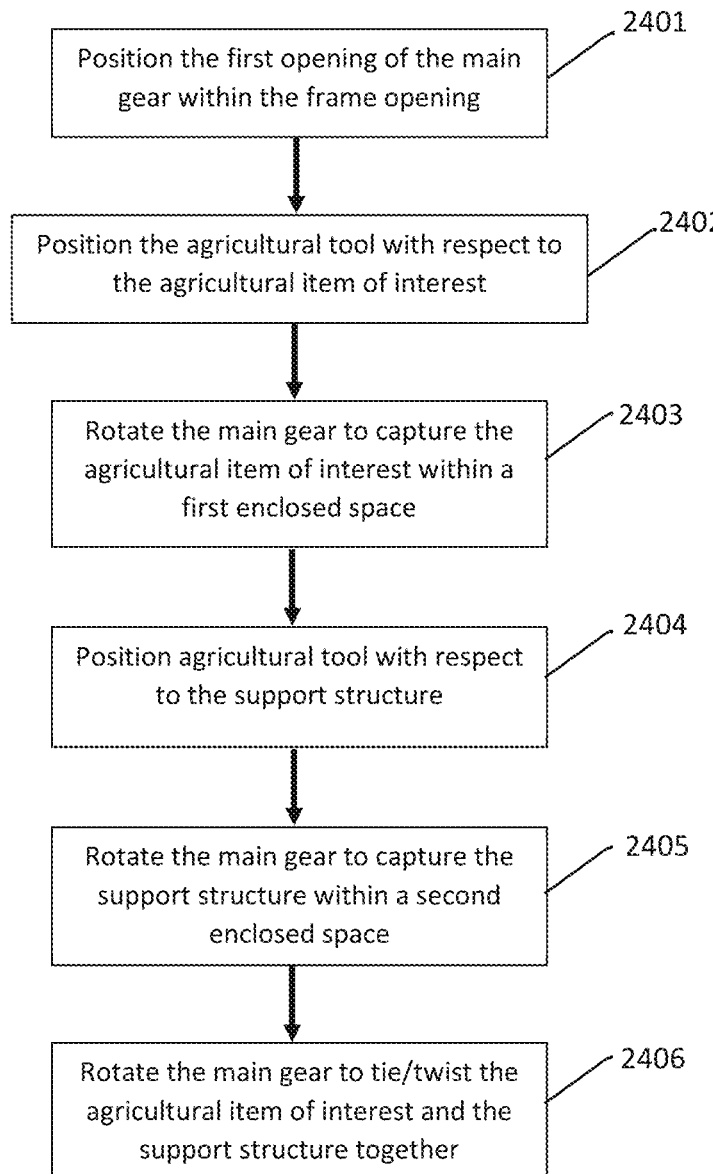
FIG. 24 is a flowchart showing a tying/twisting process performed according to a preferred embodiment of the present invention.

The task of tying/twisting an agricultural item of interest A and a support structure S together is discussed below with reference to steps 2410 through 2406 in the flow chart shown in FIG. 24.

Figure 26:
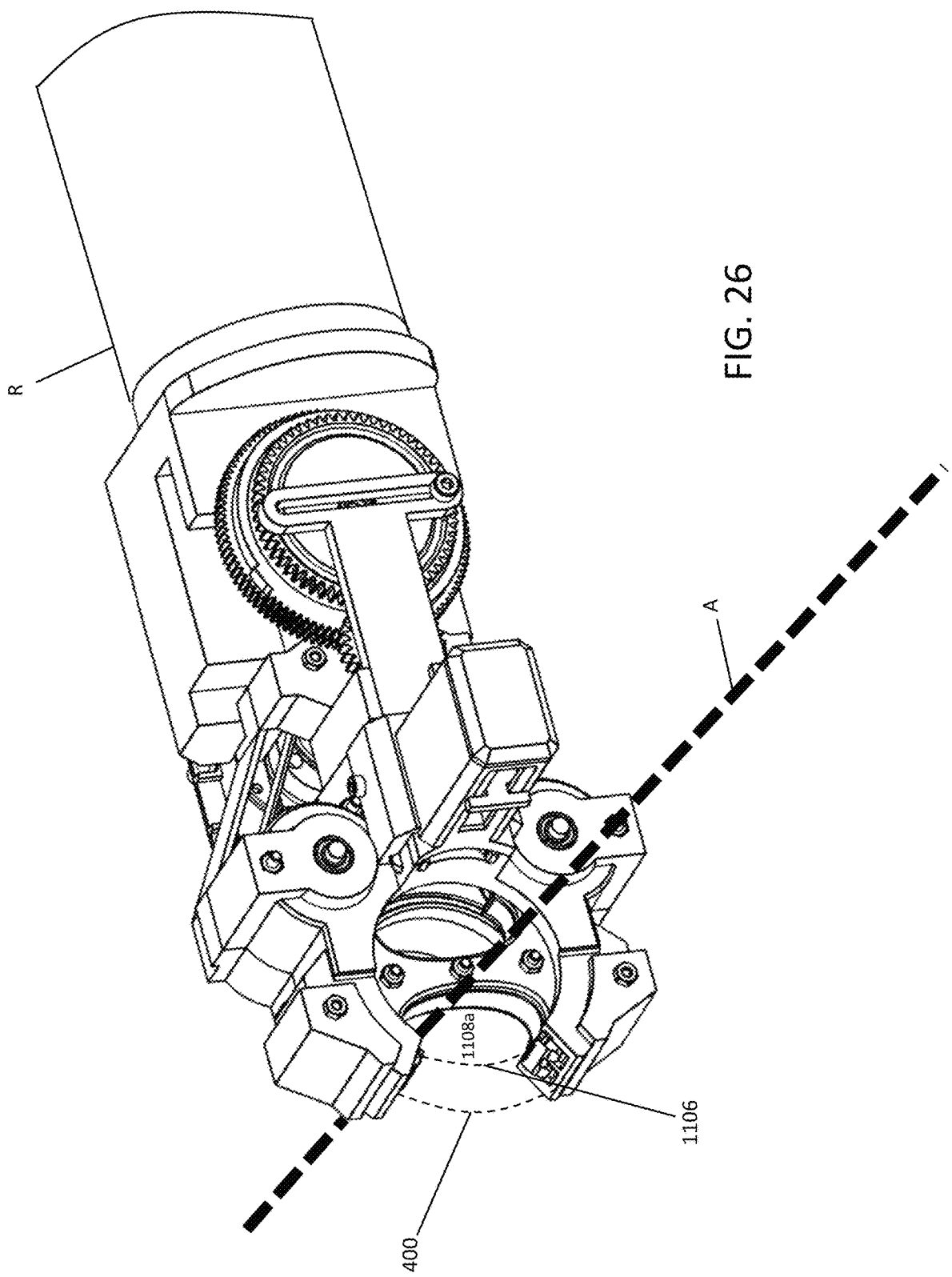
FIG. 26 shows a step of a tying/twisting process performed according to a preferred embodiment of the present invention.

In step S2401, the first opening 1106 of the main gear 110 (see FIG. 11, for example) is aligned with the frame opening 400 (see FIG. 3, for example), as shown in FIG. 26, for example. More specifically, in a preferred embodiment, the motor 106 is driven to rotate the main gear 110 such that the first opening 1106 of the main gear 110 is aligned with the frame opening 400 of the frame 104.

In step 2402, the agricultural tool 100 is positioned with respect to an agricultural item of interest A, which is indicated with the dashed line A in FIG. 26. As discussed above, an agricultural item of interest A can include a grape vine cane, a branch, a stem, a vine or another object. More specifically, in step 2402, a robotic arm R to which the agricultural tool 100 is attached is controlled to move the agricultural tool 100 such that the agricultural item of interest A is positioned within the first receiving space 1108a of the main gear 110, as shown in FIG. 26. In a preferred embodiment, the robotic arm R can be controlled such that a particular portion of the agricultural item of interest A is positioned within the first receiving space 1108a. For example, in a case where the agricultural item of interest A is a grape vine cane, the robotic arm R can be controlled such that a portion of the grape vine cane (e.g., a portion 60% of a distance from a first end of the grape vine cane attached to a trunk of the grape vine and a second end of the grape vine cane which is a free end) is positioned within the first receiving space 1108a.

Figure 27:
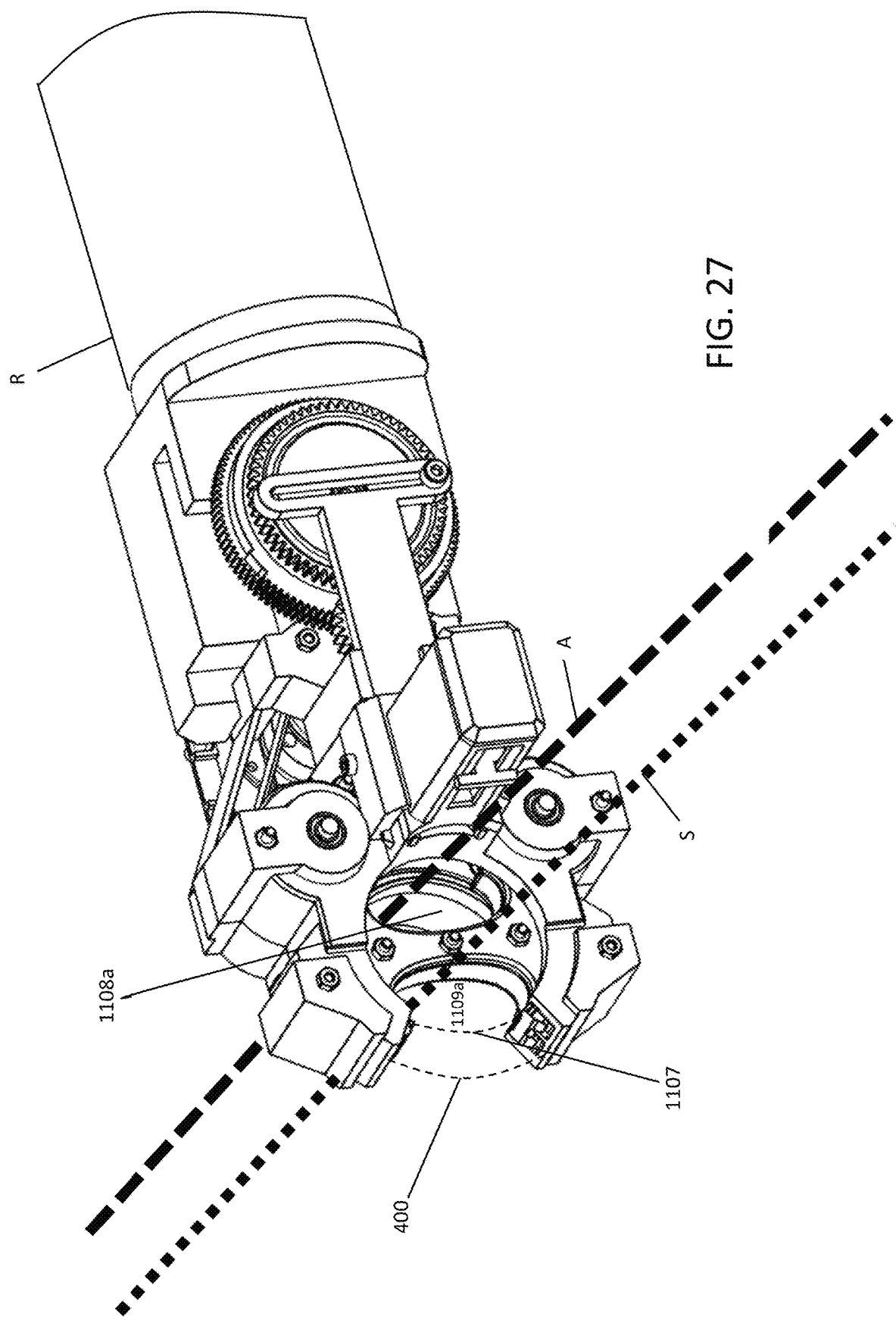
FIG. 27 shows a step of a tying/twisting process performed according to a preferred embodiment of the present invention.

In step 2403, the main gear 110 is rotated to capture the agricultural item of interest A within a first enclosed space defined by the first receiving space 1108a and the frame 104, as shown in FIG. 27, for example. More specifically, the motor 106 is driven by a predetermined amount that causes the main gear 110 to rotate 0.5 rotations, for example, such that the agricultural item of interest A is captured within a first enclosed space defined by the first receiving portion 1108, facing rearwardly after the 0.5 rotations of the main gear 110, and the frame 104. As shown in FIG. 27, the second opening 1107 of the main gear 110 (see FIG. 11, for example) is aligned with the frame opening 400 after the main gear 110 has been rotated in step 2403.

In step 2404, the agricultural tool 100 is positioned with respect to a support structure S, which is indicated by the fine dashed line S in FIG. 27. The support structure S can include a trellis, wire, string, or another support structure object. More specifically, in step 2404, a robotic arm R to which the agricultural tool 100 is attached is controlled to move the agricultural tool 100 such that the support structure S is positioned within the second receiving space 1109a of the main gear 110, as shown in FIG. 27. In a preferred embodiment, the robotic arm R can be controlled such that a particular portion of the support structure S is positioned within the second receiving space 1109a. For example, in a case in which the support structure S is a wire, the robotic arm R can be controlled such that a middle point along a length of the wire is positioned within the second receiving space 1109a.

Figure 28:
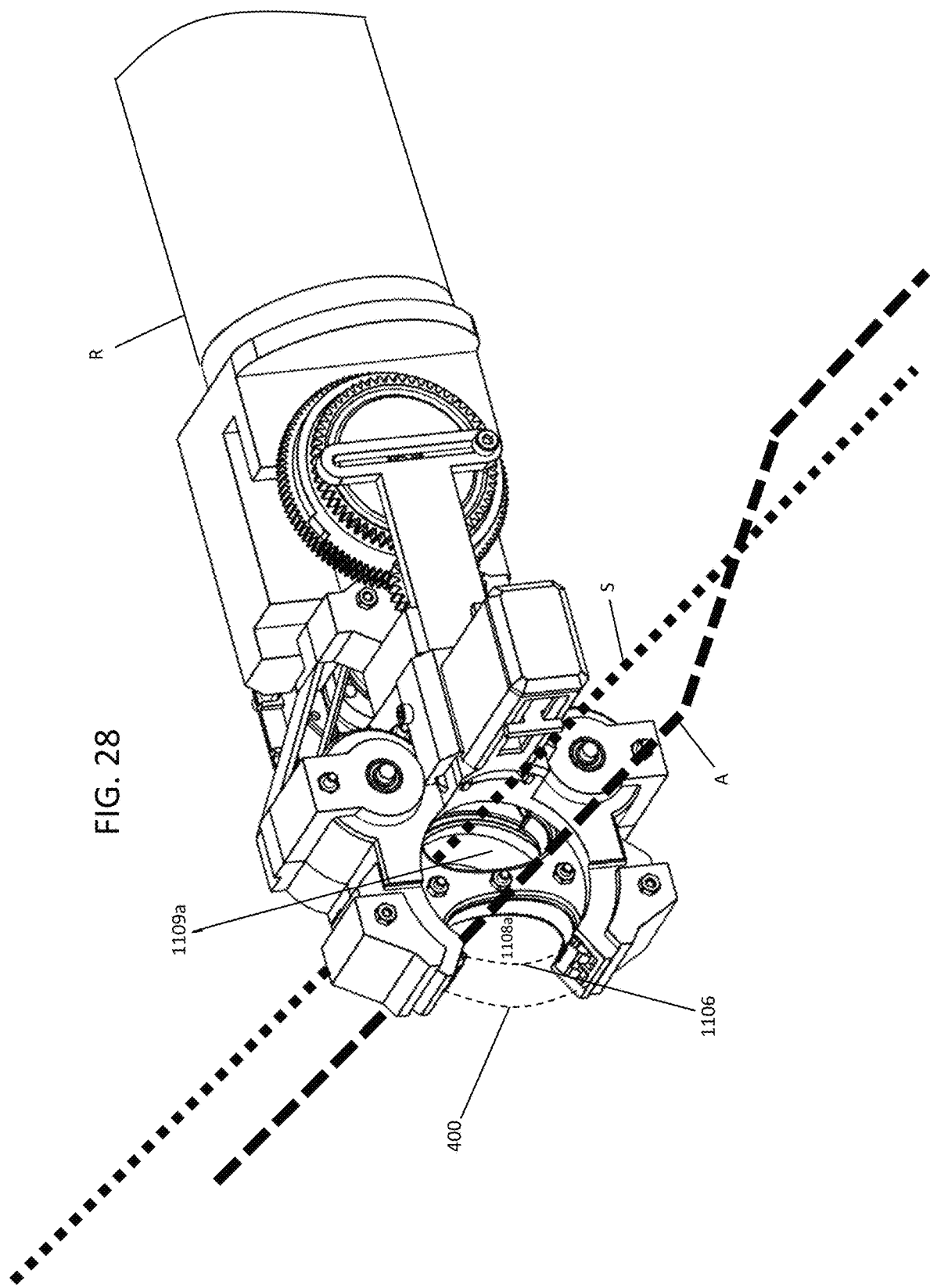
FIG. 28 shows a step of a tying/twisting process performed according to a preferred embodiment of the present invention.

In step 2405, the main gear 110 is rotated to capture the support structure S within a second enclosed space defined by the second receiving portion 1109 and the frame 104, as shown in FIG. 28, for example. More specifically, the motor 106 is driven by a predetermined amount that causes the main gear 110 to rotate 0.5 rotations, for example, such that the support structure S is captured within the second enclosed space defined by the second receiving portion 1109 (facing rearwardly after the 0.5 rotations of the main gear 110 in step S2405) and the frame 104. As shown in FIG. 28, the first opening 1106 of the main gear 110 is aligned with the frame opening 400 after the main gear 110 has been rotated in step 2405, and the agricultural item of interest A remains positioned within the first receiving space 1108a.

Figure 29:
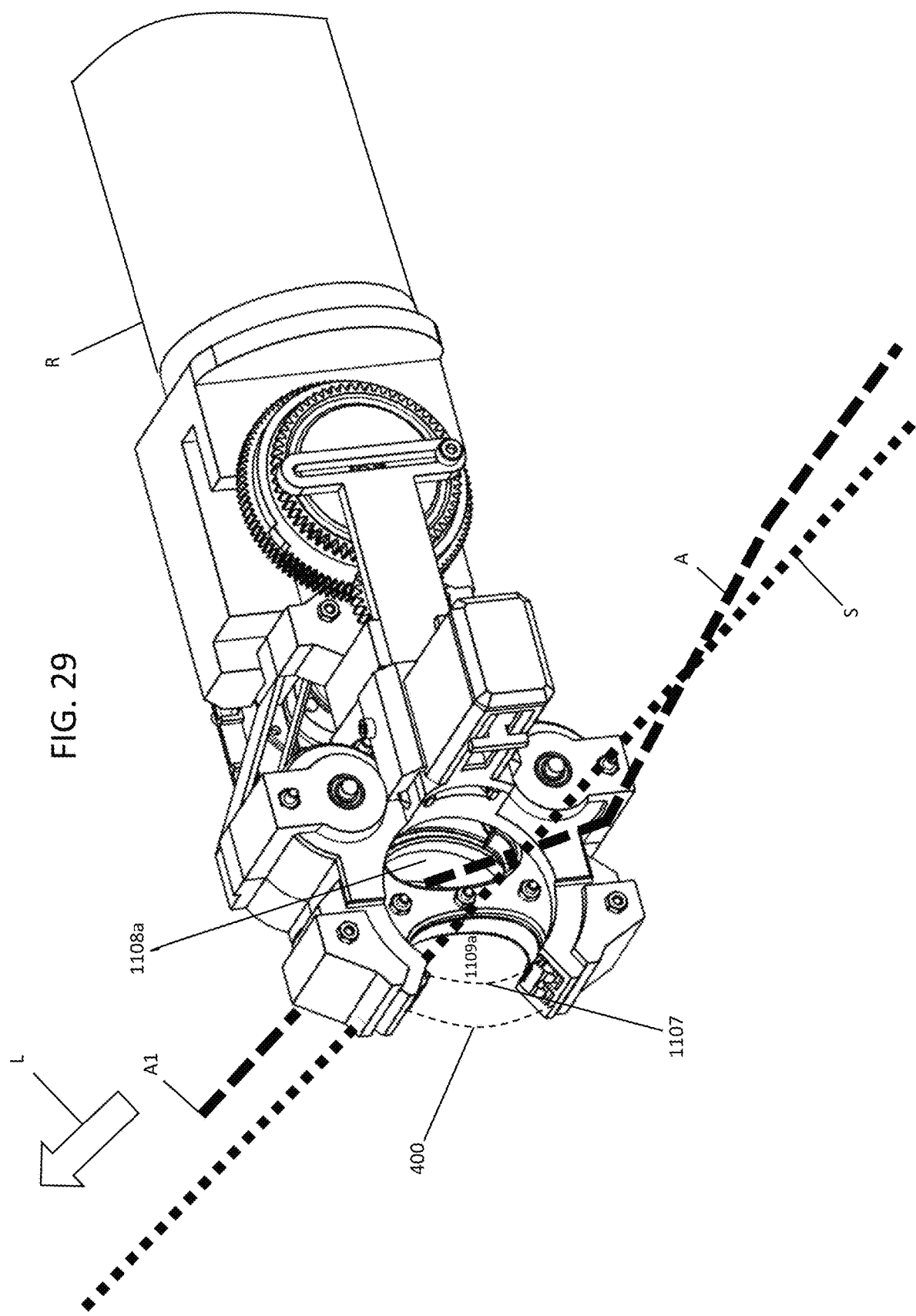
FIG. 29 shows a step of a tying/twisting process performed according to a preferred embodiment of the present invention.

In step 2406, the main gear 110 is further rotated to tie/twist the agricultural item of interest A and the support structure S together, as shown in FIG. 29, for example. More specifically, the motor 106 is driven by a predetermined amount that causes the main gear 110 to rotate 0.5 rotations such that the agricultural item of interest A and the support structure S are twisted/tied together. When the agricultural item of interest A and the support structure S are twisted/tied together, the support structure S supports the agricultural item of interest A which has been twisted over and under the support structure S.

In a preferred embodiment of the present invention, the agricultural tool 100 can fasten or attach the agricultural item of interest A to the support structure S using a clip, such as the clip 146 described above. For example, in a preferred embodiment, the agricultural tool 100 can fasten the agricultural item of interest A to the support structure S using the clip 146, after the agricultural item of interest A and the support structure S have been twisted/tied together in step 2406.

Figure 25:
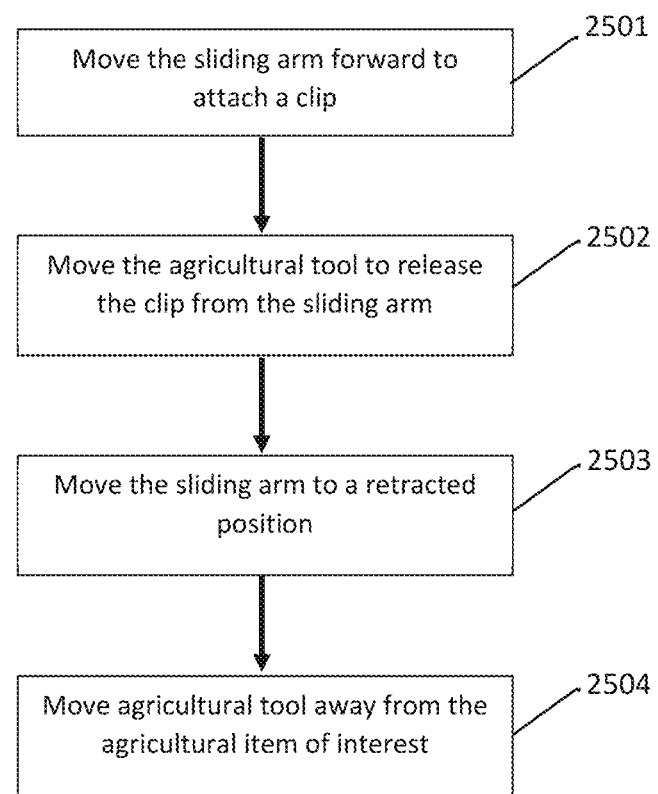
FIG. 25 is a flowchart showing a fastening process performed according to a preferred embodiment of the present invention.

The task of fastening the agricultural item of interest A to the support structure S using a clip is discussed below with reference to steps 2501 through 2504 in the flow chart shown in FIG. 25.

In step 2501, the sliding arm 114 is moved forward from a retracted position to a deployed position to attach a clip 146 to the agricultural item of interest A and the support structure S. More specifically, a forward movement of the sliding arm 114 pushes the agricultural item of interest A and the support structure S through the space 1469 located between the tip of the left protrusion 1468a and the tip of the right protrusion 1468b of the clip 146 and into the clip receiving space 1466 of the clip 146 (see FIG. 22).

In a preferred embodiment of the present invention, the sliding arm 114 starts to move forward from the retracted position (e.g., a rearmost position of the sliding arm 114) towards the deployed position (e.g., a forwardmost position of the sliding arm 114) when the teeth portion 1385 of the timing gear 138 starts to contact and drive the first diameter portion 1401 of the linking gear 140. As discussed above with respect to FIG. 14, the teeth portion 1385 of the timing gear 138 is only attached to a portion of a periphery of the timing gear 138, such that a portion of the periphery of the timing gear 138 does not have teeth attached thereto.

When the timing gear 138 has been rotated such that the teeth portion 1385 contact and drive the first diameter portion 1401 of the linking gear 140, the linking gear 140 is driven, which in turn rotates the sliding arm gear 142 and the bolt or shaft 1424 attached thereto which causes the sliding arm 114 to move in a forward-rearward direction. On the contrary, when the timing gear 138 has been rotated such that the teeth portion 1385 do not contact the first diameter portion 1401 of the linking gear 140, i.e., when a portion of the periphery of the timing gear 138 that does not have teeth attached thereto faces the first diameter portion 1401 of the linking gear 140, then the linking gear 140 is not driven, and the sliding arm 114 does not move in a forward-rearward direction.

In a preferred embodiment of the present invention, a number of teeth of each of the taping gear 134, the base gear 136, the timing gear 138, the linking gear 140, and the sliding arm gear 142 can be set such that the sliding arm 114 starts to move forward from the retracted position towards the deployed position (i.e., when the teeth portion 1385 of the timing gear 138 starts to drive the first diameter portion 1401 of the linking gear 140) after a predetermined number of rotations of the main gear 110 (after the motor 106 has been driven by a predetermined amount). For example, in a preferred embodiment of the present invention, a number of teeth of each of the taping gear 134, the base gear 136, the timing gear 138, the linking gear 140, and the sliding arm gear 142 can be set such that the sliding arm 114 starts to move forward from the retracted position towards the deployed position after the main gear 110 has been rotated 1.5 times, which is a number of rotations of the main gear 110 completed in steps 2403 (0.5 rotations), 2405 (0.5 rotations), and 2506 (0.5 rotations) during which the agricultural item of interest A and the support structure S are tied/twisted together. Thus, the sliding arm 114 can be controlled to start to move forward from a retracted position to a deployed position to attach a clip 146 to the agricultural item of interest A and the support structure S, which have been tied/twisted together, in response to step 2406 in FIG. 24 having been completed.

In step 2502, the agricultural tool 100 is moved to release the clip 146 from the sliding arm 114. For example, in step 2502, the robotic arm R to which the agricultural tool 100 (and the sliding arm 114) is attached can be controlled to move the agricultural tool 100 (and the sliding arm 114) laterally, e.g., in the direction of arrow L in FIG. 29, by a first predetermined distance to release the clip 146 from the holder of the sliding arm 114.

In step 2503, the sliding arm 114 is moved back to a retracted position from the deployed position. For example, the motor 106 can be driven in reverse by a predetermined amount to retract the sliding arm 114 from the deployed position to the retracted position.

In step 2504, the agricultural tool 100 (and the sliding arm 114) is moved so that the agricultural item of interest A is no longer located within the first receiving space 1108a. For example, in step 2504, the robotic arm R to which the agricultural tool 100 is attached can be controlled to move the agricultural tool 100 laterally (e.g., direction of arrow L in FIG. 29) by a second predetermined distance so that the agricultural item of interest A is no longer located within the first receiving space 1108a. For example, the agricultural tool 100 can be moved laterally so that an end A1 of the agricultural item of interest A passes through the first receiving space 1108a such that the agricultural item of interest A is no longer located within the first receiving space 1108*a*. After the agricultural tool 100 is moved so that the agricultural item of interest A is no longer located within the first receiving space 1108*a*, the agricultural tool 100 can be moved freely (e.g., to a new location). In a preferred embodiment of the present invention, the second predetermined distance in step 2504 is larger than the first predetermined distance in step 2502.

In a preferred embodiment of the present invention discussed above, a number of teeth of each of the taping gear 134, the base gear 136, the timing gear 138, the linking gear 140, and the sliding arm gear 142 can be set such that the sliding arm 114 starts to move forward from the retracted position towards the deployed position (i.e., when the teeth portion 138*b* of the timing gear 138 starts to drive the first diameter portion 140*a* of the linking gear 140) after a predetermined number of rotations of the main gear 110 (after the motor 106 has been driven by a predetermined amount). Accordingly, the motor 106 (a single motor) can effectively be used to rotate the main gear 110 to tie/twist the agricultural item of interest A and the support structure S together as well as move the sliding arm 114 from a retracted position to deployed position to attach a clip 146 to the agricultural item of interest A and the support structure S which have been tied/twisted together. However, as an alternative, the agricultural tool can include a first motor to rotate the main gear, and a second motor to control the forward-rearward movement of the sliding arm 114.

Figure 30:
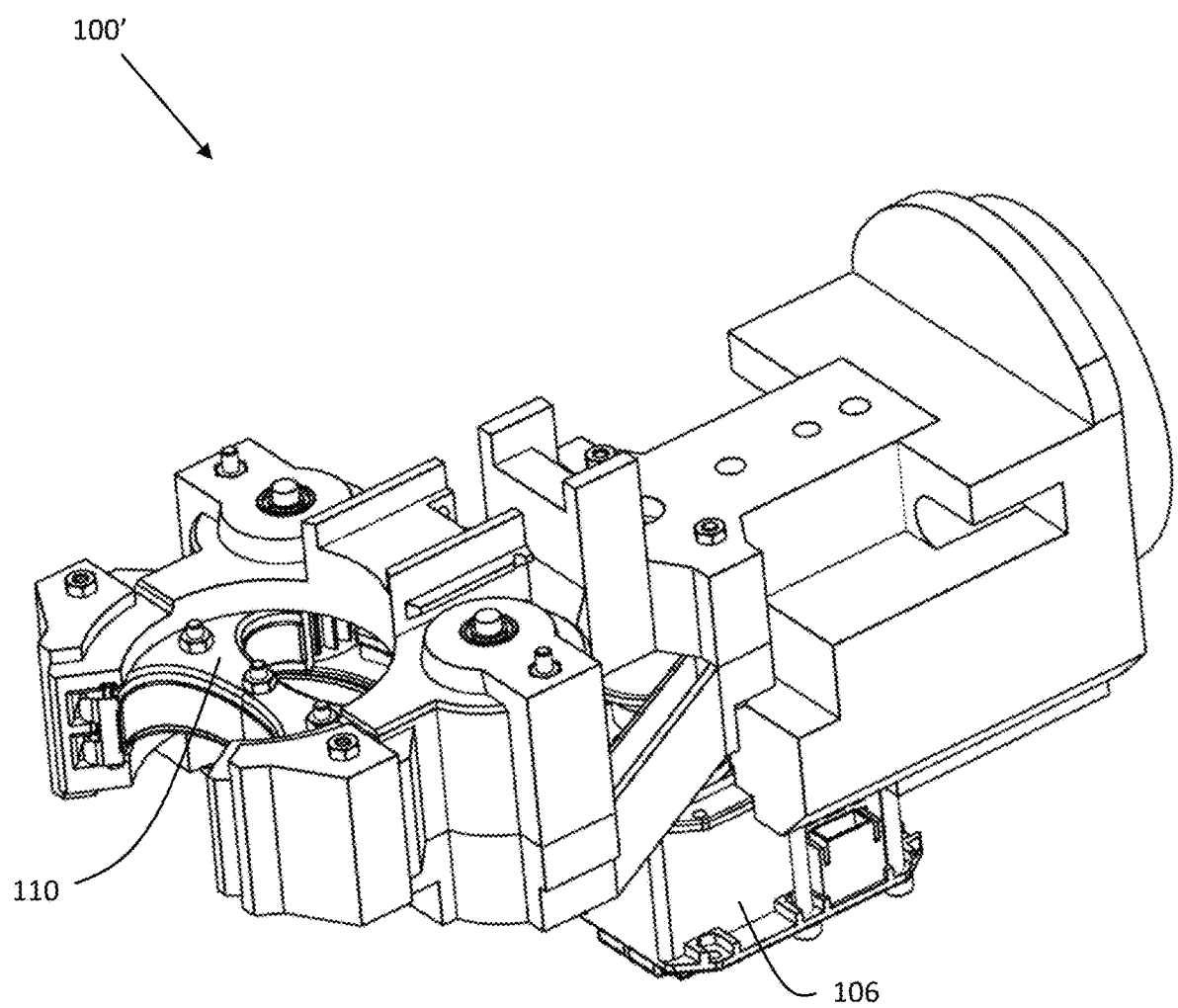
FIG. 30 shows a front perspective view of an agricultural tool according to another preferred embodiment of the present invention.

In a preferred embodiment of the present invention discussed above, the agricultural tool 100 can be used to perform a plurality of tasks including tying/twisting an agricultural item of interest A and a support structure S together, and fastening or attaching the agricultural item of interest A to the support structure S using a clip, such as the clip 146 described above. However, an agricultural tool 100' according to a preferred embodiment may be configured to perform the task of tying/twisting an agricultural item of interest A and a support structure S together without also being configured to perform the task of fastening the agricultural item of interest A to the support structure S using a clip. For example, the agricultural tool 100' shown in FIG. 30 may not include the taping gear 134, the base gear 136, the timing gear 138, the linking gear 140, the sliding arm gear 142, the sliding arm 114, and the magazine 144. Preferably, the agricultural tool 100' may only perform the steps 2401 through 2406 discussed with respect to FIG. 24.

Figure 31:
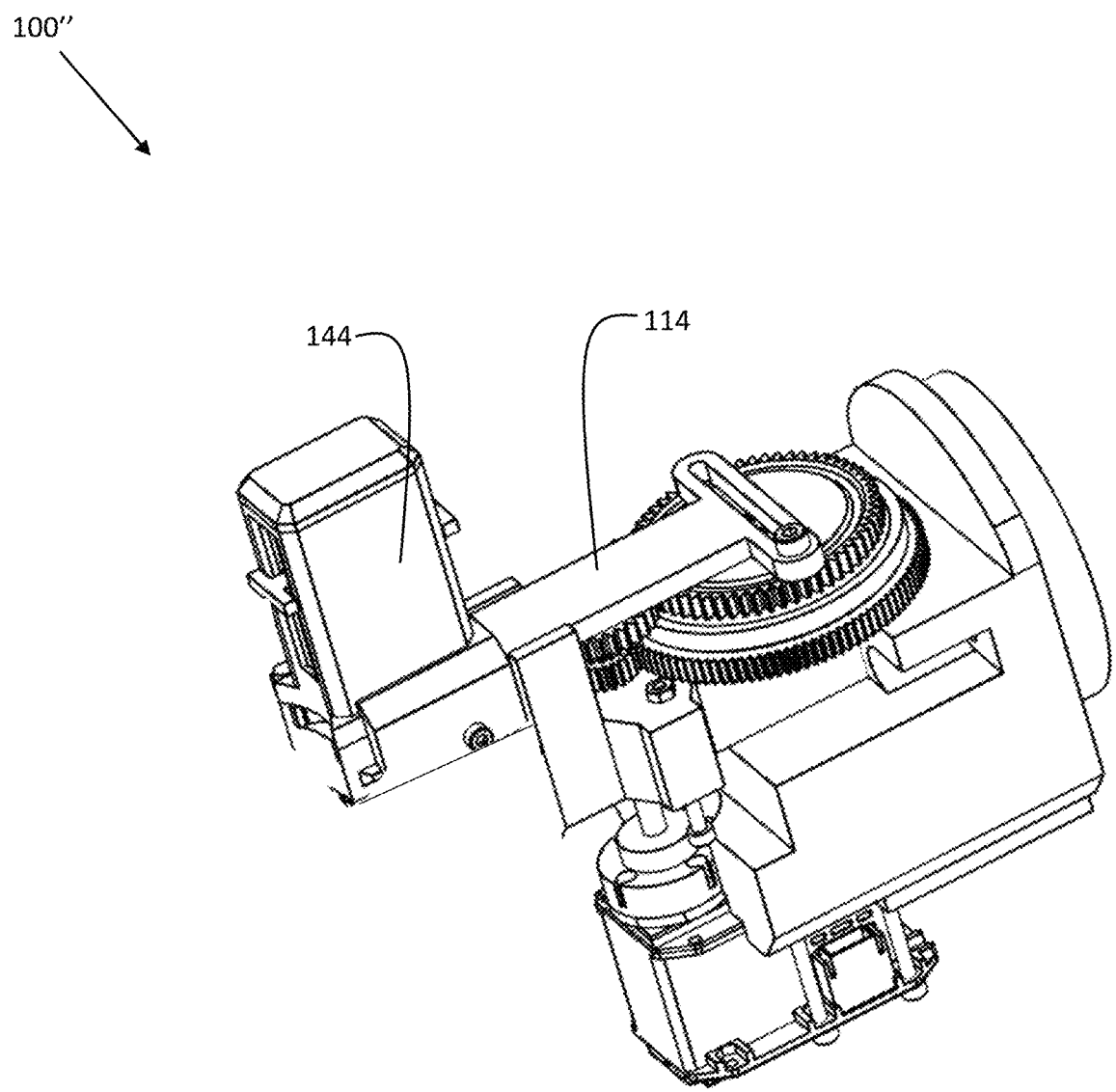
FIG. 31 shows a front perspective view of an agricultural tool according to yet another preferred embodiment of the present invention.

An agricultural tool 100" according to a preferred embodiment may be configured to perform the task of fastening or attaching the agricultural item of interest A to the support structure S using a clip, such as the clip 146, without also being configured to perform the task of tying/twisting an agricultural item of interest A and a support structure S together. For example, the agricultural tool 100" shown in FIG. 31 may not include the motor pulley 116, the belt 118, the first driving pulley 120, the second driving pulley 122, the first driving gear 128, the second driving gear 130, and the main gear 110. Preferably, the agricultural tool 100" may only perform the steps 2501 through 2504 discussed with respect to FIG. 25.

In a preferred embodiment of the present invention, the agricultural tool 100 can include a controller 148 configured or programmed to control the motor 106. For example, the controller 148 can be configured or programmed to control the timing, and in what direction, the motor 106 is running. For example, the controller 148 can be configured or programmed to control the timing, and in what direction, the motor 106 is running in accordance with the steps discussed above with respect to FIGS. 24 and 25. More specifically, in step 2401, the controller 148 can be configured or programmed to drive the motor 106 by a predetermined amount, and in a predetermined direction, to rotate the main gear 110 such that the first opening 1106 of the main gear 110 is aligned with the frame opening 400 of the frame 104.

In step 2403, the controller 148 can be configured or programmed to drive the motor 106 by a predetermined amount, and in a predetermined direction (forward direction), that causes the main gear 110 to rotate 0.5 rotations such that the agricultural item of interest A is captured within the first enclosed space defined by the first receiving portion 1108 and the frame 104.

In step 2405, the controller 148 can be configured or programmed to drive the motor 106 by a predetermined amount, and in a predetermined direction (forward direction) that causes the main gear 110 to rotate 0.5 rotations, for example, such that the support structure S is captured within the second enclosed space defined by the second receiving portion 1109 and the frame 104.

In step 2406, the controller 148 can be configured or programmed to drive the motor 106 by a predetermined amount, and in a predetermined direction (forward direction), that causes the main gear 110 to rotate 0.5 rotations, for example, such that the agricultural item of interest A and the support structure S are twisted/tied together.

In step 2501, the controller 148 can be configured or programmed to drive the motor 106 by a predetermined amount, and in a predetermined direction (forward direction), that causes the sliding arm 114 to move from a retracted position to a deployed position to attach a clip to the agricultural item of interest A and the support structure S.

In step 2503, the controller 148 can be configured or programmed to drive the motor 106 by a predetermined amount, and in a determined direction (reverse direction), that causes the sliding arm 114 to move to a retracted position of the sliding arm 114.

In a preferred embodiment of the present invention, the controller 148 can be located within a housing of the motor 106 as shown in FIG. 1, but may be provided in other locations. Additionally, part or whole of the controller 148 and/or the functional units or blocks thereof as described herein with respect to the various preferred embodiments of the present invention can be implemented in one or more circuits or circuitry, such as an integrated circuit(s) or as an LSI (large scale integration). Each functional unit or block of the controller 148 may be individually made into an integrated circuit chip. Alternatively, part or whole of the functional units or blocks may be integrated and made into an integrated circuit chip. Additionally, the method of forming a circuit or circuitry defining the controller 148 is not limited to LSI, and an integrated circuit may be implemented by a dedicated circuit or a general-purpose processor or controller that is specifically programed to define a special-purpose processor or controller. Further, if technology of forming an integrated circuit, which replaces LSI, arises as a result of advances in semiconductor technology, an integrated circuit formed by that technology may be used.

Furthermore, a program which is operated in the controller 148 and/or other elements of various preferred embodiments of the present invention, is a program (program causing a computer to perform a function or functions) controlling a controller, in order to realize functions of the various preferred embodiments according to the present invention, including each of the various circuits or circuitry described herein and recited in the claims. Therefore, information which is handled by the controller is temporarily accumulated in a RAM at the time of the processing. Thereafter, the information is stored in various types of circuitry in the form of ROMs and HDDs, and is read out by circuitry within, or included in combination with, the controller as necessary, and modification or write-in is performed thereto. As a recording medium storing the program, any one of a semiconductor medium (for example, the ROM, a nonvolatile memory card or the like), an optical recording medium (for example, a DVD, an MO, an MD, a CD, a BD or the like), and a magnetic recording medium (for example, a magnetic tape, a flexible disc or the like) may be used. Moreover, by executing the loaded program, the functions of the various preferred embodiments of the present invention are not only realized, but the functions of preferred embodiments of the present invention may be realized by processing the loaded program in combination with an operating system or other application programs, based on an instruction of the program.

Moreover, in a case of being distributed in a market, the program can be distributed by being stored in the portable recording medium, or the program can be transmitted to a server computer which is connected through a network such as the Internet. In this case, a storage device of the server computer is also included in preferred embodiments of the present invention. In addition, in the preferred embodiments described above, a portion or an entirety of the various functional units or blocks may be realized as an LSI which is typically an integrated circuit. Each functional unit or block of the controller may be individually chipped, or a portion thereof, or the whole thereof may be chipped by being integrated. In a case of making each functional block or unit as an integrated circuit, an integrated circuit controller that controls the integrated circuits, may be added.

Additionally, the method for making an integrated circuit is not limited to the LSI, and may be realized by a single-purpose circuit or a general-purpose processor that is programmable to perform the functions described above to define a special-purpose computer. Moreover, in a case of an appearance of a technology for making an integrated circuit which replaces the LSI due to an advance of a semiconductor technology, it is possible to use an integrated circuit depending on the technology.

Finally, it should be noted that the description and recitation in claims of this patent application referring to "controller", "circuit", or "circuitry" is in no way limited to an implementation that is hardware only, and as persons of ordinary skill in the relevant art would know and understand, such descriptions and recitations of "controller", "circuit", or "circuitry" include combined hardware and software implementations in which the controller, circuit, or circuitry is operative to perform functions and operations based on machine readable programs, software or other instructions in any form that are usable to operate the controller, circuit, or circuitry.

In a preferred embodiment of the present invention, the motor 106 may not be controlled by the controller 148, or may not fully be controlled by the controller 148. For example, a timing and/or in what direction the motor 106 is running can be controlled by a user operated device or another technique of controlling the motor 106.

In a preferred embodiment of the present invention, the agricultural tool 100 can include a battery which is arranged to supply power to components, such as, the motor 106 and the controller 148, etc. For example, the battery can be a rechargeable battery. Alternatively, components included in the agricultural tool, such as the motor 106 and the controller 148, can be provided power using an external power supply.

In a preferred embodiment of the present invention, the robotic arm R discussed above can include a robotic arm known to a person of ordinary skill in the art. For example, the robotic arm R, also known as an articulated robotic arm, can include a plurality of joints that act as axes that enable a degree of movement, wherein the higher number of rotary joints the robotic arm R includes, the more freedom of movement the robotic arm has. For example, although not shown in the figures included herein, the robotic arm R can include four to six joints, which provide the same number of axes of rotation for movement.

In a preferred embodiment of the present invention, the controller 148 can be configured or programmed to control movement of the robotic arm R. For example, the controller 148 can be configured or programmed to control the movement of the robotic arm R to which the agricultural tool 100 is attached to position the agricultural tool 100 in accordance with the steps discussed above with respect to FIGS. 24 and 25. For example, the controller 148 can be configured or programed to control movement of the robotic arm R based on a location of an object such as the agricultural item of interest A or the support structure S, whose location can be determined using a stereo camera, a depth camera such as an INTEL® REALSENSE™ LiDAR Camera L515, GPS (Global Positioning System) data, or another method of determining a location of an object.

More specifically, in step 2402, the controller 148 can be configured or programmed to control the robotic arm R to which the agricultural tool 100 is attached is to move the agricultural tool 100 such that that a particular portion of the agricultural item of interest A is positioned within the first receiving space 1108a of the main gear 110.

In step 2404, the controller 148 can be configured or programmed to control the robotic arm R to which the agricultural tool 100 is attached to move the agricultural tool 100 such that a particular portion of the support structure S is positioned within the second receiving space 1109a of the main gear 110.

In step 2502, the controller 148 can be configured or programmed to control the robotic arm R to which the agricultural tool 100 is attached to move the agricultural tool 100 to release the clip 146 from the sliding arm 114.

In step 2504, the controller 148 can be configured or programmed to control the robotic arm R to which the agricultural tool 100 is attached is to move the agricultural tool 100 so that the agricultural item of interest A is no longer located within the first receiving space 1108a of the main gear 110.

In a preferred embodiment of the present invention, the robotic arm R may not be controlled by the controller 148, or may not fully be controlled by the controller 148. For example, movement of the robotic arm R can be controlled by a user-operated device or another known technique of controlling a robotic arm. Furthermore, in a preferred embodiment of the present invention that does not include a robotic arm, such as a preferred embodiment in which the base plate 1021 is mounted to another structure such as a handle, the movement of the agricultural tool 100 can be performed by a person holding and moving the handle.

It should be understood that the foregoing description is only illustrative of the present invention. Various alternatives and modifications can be devised by those skilled in the art without departing from the present invention. Accordingly, the present invention is intended to embrace all such alternatives, modifications, and variances that fall within the scope of the appended claims.

What is claimed is:

1. An agricultural clip for fastening or attaching an agricultural item of interest to a support structure, the agricultural clip comprising:
    a base portion;
    a left arm portion attached to the base portion;
    a right arm portion attached to the base portion; and
    a curved protrusion; wherein
    the left arm portion and the right arm portion define a clip receiving space to receive the agricultural item of interest and the support structure;
    the curved protrusion includes a first end attached to one of the left arm portion and the right arm portion, and a second end which is a free end that protrudes into the clip receiving space;
    the left arm portion includes a first left portion and a second left portion connected to the first left portion by a left tapered portion;
    the right arm portion includes a first right portion and a second right portion connected to the first right portion by a right tapered portion;
    the first left portion is curved, includes a flat outer surface, and is connected to the base portion by a left connection portion;
    the first right portion is curved, includes a flat outer surface, and is connected to the base portion by a right connection portion;
    the left connection portion defines a first curved recess;
    the right connection portion defines a second curved recess;
    the first left portion includes a first middle portion located between the left connection portion and the left tapered portion, the first middle portion is thinner than a rear portion of the first left portion which is located closer to the left connection portion than to the left tapered portion, and is thinner than a forward portion of the first left portion which is located closer to the left tapered portion than to the left connection portion; and
    the first right portion includes a second middle portion located between the right connection portion and the right tapered portion, the second middle portion is thinner than a rear portion of the first right portion which is located closer to the right connection portion than to the right tapered portion, and is thinner than a forward portion of the first right portion which is located closer to the right tapered portion than to the right connection portion.

2. The agricultural clip according to claim 1, wherein the base portion is rectangularly shaped and includes a rear wall surface, a front wall surface, a left wall surface, and a right wall surface.

3. The agricultural clip according to claim 1, wherein
    the second left portion includes a first end attached to the left tapered portion and a second end which is a free end;
    the second left portion extends diagonally outward from the first end of the second left portion towards the second end of the second left portion;
    the second right portion includes a first end attached to the right tapered portion and a second end which is a free end; and
    the second right portion extends diagonally outward from the first end of the second right portion towards the second end of the second right portion.

4. The agricultural clip according to claim 3, wherein
    the second end of the second left portion includes a flat outer surface; and
    the second end of the second right portion includes a flat outer surface.

5. The agricultural clip according to claim 1, wherein
    the left arm portion includes a left protrusion attached to the first left portion;
    the left protrusion includes a first base attached to the first left portion and a main body that extends inwardly, towards the clip receiving space, from the first base to a tip of the left protrusion;
    the right arm portion includes a right protrusion attached to the first right portion;
    the right protrusion includes a second base attached to the first right portion and a main body that extends inwardly, towards the clip receiving space, from the second base to a tip of the right protrusion; and
    a space located between the tip of the left protrusion and the tip of the right protrusion defines an opening of the clip receiving space.

6. The agricultural clip according to claim 5, wherein
    the left arm portion and the right arm portion define the clip receiving space such that movement of the clip towards the agricultural item of interest and the support structure pushes the agricultural item of interest and the support structure through the space located between the tip of the left protrusion and the tip of the right protrusion and into the clip receiving space.

7. The agricultural clip according to claim 1, wherein
    the first end of the curved protrusion is attached to the first left portion at a position located closer to the left tapered portion than to the left connection portion, or is attached to the first right portion at a position located closer to the right tapered portion than to the right connection portion.

8. An agricultural clip for fastening or attaching an agricultural item of interest to a support structure, the agricultural clip comprising:
    a base portion;
    a left arm portion attached to the base portion;
    a right arm portion attached to the base portion; and
    a curved protrusion; wherein
    the left arm portion and the right arm portion define a clip receiving space to receive the agricultural item of interest and the support structure;
    the curved protrusion includes a first end attached to one of the left arm portion and the right arm portion, and a second end which is a free end that protrudes into the clip receiving space;
    the left arm portion includes a first left portion and a second left portion connected to the first left portion by a left tapered portion;
    the right arm portion includes a first right portion and a second right portion connected to the first right portion by a right tapered portion;
    the first left portion is curved and is connected to the base portion by a left connection portion;
    the first right portion is curved and is connected to the base portion by a right connection portion; and
    the first end of the curved protrusion is attached to the first left portion at a position located closer to the left connection portion than to the left tapered portion, or is attached to the first right portion at a position located closer to the right connection portion than to the right tapered portion.

9. The agricultural clip according to claim 1, wherein
the second end of the curved protrusion protrudes into the clip receiving space such that the curved protrusion is flexible and able to bend when the agricultural item of interest grows.

10. The agricultural clip according to claim 1, wherein
the base portion is rectangularly shaped and includes a rear wall surface, a front wall surface, a left wall surface, and a right wall surface;
the second left portion includes a first end attached to the left tapered portion and a second end which is a free end;
the second end of the second left portion includes a flat outer surface;
the left wall surface of the base portion, the flat outer surface of the first left portion, and the flat outer surface of the second end of the second left portion are coplanar;
the second right portion includes a first end attached to the right tapered portion and a second end which is a free end;
the second end of the second right portion includes a flat outer surface; and
the right wall surface of the base portion, the flat outer surface of the first right portion, and the flat outer surface of the second end of the second right portion are coplanar.

11. An agricultural clip for fastening or attaching an agricultural item of interest to a support structure, the agricultural clip comprising:
a base portion;
a left arm portion attached to the base portion; and
a right arm portion attached to the base portion; wherein
the left arm portion and the right arm portion define a clip receiving space to receive the agricultural item of interest and the support structure;
the left arm portion includes a first left portion and a second left portion connected to the first left portion by a left tapered portion;
the right arm portion includes a first right portion and a second right portion connected to the first right portion by a right tapered portion;
the first left portion is curved, includes a flat outer surface, and is connected to the base portion by a left connection portion;
the first right portion is curved, includes a flat outer surface, and is connected to the base portion by a right connection portion;
the left connection portion defines a first curved recess;
the right connection portion defines a second curved recess;
the first left portion includes a first middle portion located between the left connection portion and the left tapered portion, the first middle portion is thinner than a rear portion of the first left portion which is located closer to the left connection portion than to the left tapered portion, and is thinner than a forward portion of the first left portion which is located closer to the left tapered portion than to the left connection portion; and
the first right portion includes a second middle portion located between the right connection portion and the right tapered portion, the second middle portion is thinner than a rear portion of the first right portion which is located closer to the right connection portion than to the right tapered portion, and is thinner than a forward portion of the first right portion which is located closer to the right tapered portion than to the right connection portion.

12. The agricultural clip according to claim 11, wherein
the second left portion includes a first end attached to the left tapered portion and a second end which is a free end;
the second left portion extends diagonally outward from the first end of the second left portion towards the second end of the second left portion;
the second right portion includes a first end attached to the right tapered portion and a second end which is a free end; and
the second right portion extends diagonally outward from the first end of the second right portion towards the second end of the second right portion.

13. The agricultural clip according to claim 11, wherein
the left arm portion includes a left protrusion attached to the first left portion;
the left protrusion includes a first base attached to the first left portion and a main body that extends inwardly, towards the clip receiving space, from the first base to a tip of the left protrusion;
the right arm portion includes a right protrusion attached to the first right portion;
the right protrusion includes a second base attached to the first right portion and a main body that extends inwardly, towards the clip receiving space, from the second base to a tip of the right protrusion; and
a space located between the tip of the left protrusion and the tip of the right protrusion defines an opening of the clip receiving space.

14. The agricultural clip according to claim 11, wherein
the base portion is rectangularly shaped and includes a rear wall surface, a front wall surface, a left wall surface, and a right wall surface;
the second left portion includes a first end attached to the left tapered portion and a second end which is a free end;
the second end of the second left portion includes a flat outer surface;
the left wall surface of the base portion, the flat outer surface of the first left portion, and the flat outer surface of the second end of the second left portion are coplanar;
the second right portion includes a first end attached to the right tapered portion and a second end which is a free end;
the second end of the second right portion includes a flat outer surface; and
the right wall surface of the base portion, the flat outer surface of the first right portion, and the flat outer surface of the second end of the second right portion are coplanar.

* * * * *